United States Patent
Kim

(10) Patent No.: US 7,417,703 B2
(45) Date of Patent: Aug. 26, 2008

(54) LIQUID CRYSTAL DISPLAY DEVICE USING SEAL PATTERN AND FABRICATING METHOD THEREOF

(75) Inventor: Hye-Young Kim, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/503,192

(22) Filed: Aug. 14, 2006

(65) Prior Publication Data

US 2006/0274247 A1      Dec. 7, 2006

Related U.S. Application Data

(62) Division of application No. 10/747,943, filed on Dec. 31, 2003, now Pat. No. 7,154,578.

(30) Foreign Application Priority Data

Dec. 31, 2002   (KR) ............... 10-2002-0088301

(51) Int. Cl.
*G02F 1/1339* (2006.01)
*G02F 1/1333* (2006.01)

(52) U.S. Cl. ............... 349/153; 349/138; 349/155; 349/190

(58) Field of Classification Search ........... 349/153, 349/190, 138, 155
See application file for complete search history.

(56) References Cited

U.S. PATENT DOCUMENTS

| | | | |
|---|---|---|---|
| 5,671,030 A | | 9/1997 | Ohnuma et al. |
| 6,011,608 A | * | 1/2000 | Tanaka ............... 349/153 |
| 6,683,668 B2 | * | 1/2004 | Moon et al. ........... 349/138 |
| 6,697,138 B2 | | 2/2004 | Ha et al. |
| 6,819,389 B2 | | 11/2004 | Imayama et al. |
| 6,859,254 B2 | | 2/2005 | Kim et al. |
| 6,982,779 B2 | * | 1/2006 | Park et al. ............ 349/153 |
| 2003/0112387 A1 | * | 6/2003 | Lim ............... 349/110 |

* cited by examiner

*Primary Examiner*—Mike Qi
(74) *Attorney, Agent, or Firm*—Birch, Stewart, Kolasch & Birch, LLP

(57) ABSTRACT

A liquid crystal display device includes first and second substrates facing and spaced apart from each other; a first inorganic insulating layer over an inner surface of the first substrate, and a seal pattern between the first inorganic insulating layer and an inner surface of the second substrate, the seal pattern contacting the first inorganic insulating layer. The device causes the seal pattern adhesive to have reduced chemical reactivity to thereby reduce the number of defects in the liquid crystal display.

3 Claims, 15 Drawing Sheets

LIQUID CRYSTAL DISPLAY DEVICE USING SEAL PATTERN AND FABRICATING METHOD THEREOF

This application is a Divisional of application Ser. No. 10/747,943, filed on Dec. 31, 2003 now U.S. Pat. No. 7,154,578, which claims the benefit of Korean Patent Application No. 2002-88301, filed on Dec. 31, 2002 in Korea, which the entire contents of which are hereby incorporated by reference and for which priority is claimed under 35 U.S.C. § 120.

BACKGROUND OF THE INVENTION

1. Field of the Invention

The invention relates to a liquid crystal display device, and more particularly, to a liquid crystal display device using an improved seal pattern and a fabricating method thereof.

2. Description of the Background Art

In general, a liquid crystal display (LCD) device utilizes the optical anisotropy and birefringence properties of liquid crystal molecules to display images. The liquid crystal display (LCD) device usually has first and second substrates spaced apart from and opposing each other, and a liquid crystal layer interposed therebetween. The first and second substrates respectively have electrodes for forming an electric field between the electrodes. That is, if a voltage is applied to the electrodes of the liquid crystal display (LCD) device, an electric field is formed between the electrodes and the electric field changes the alignment of the liquid crystal molecules. The changed alignment of the liquid crystal molecules control the light transmittance through the liquid crystal layer, and thus images can be displayed by controlling the light transmittance through the liquid crystal layer.

FIG. 1 is an exploded perspective view of a liquid crystal display (LCD) device according to the background art. As shown in FIG. 1, a liquid crystal display (LCD) device 11 has an upper substrate 5 having a black matrix 7, a color filter layer 8 and a common electrode 18 on the color filter layer 8, and a lower substrate 22 having a thin film transistor "T" and a pixel electrode 17 connected to the thin film transistor (TFT) "T." A liquid crystal layer 14 is interposed between the upper and lower substrates 5 and 22. The lower substrate 22 is referred to as an array substrate because array lines including a gate line 13 and a data line 15 are formed thereon. The gate line 13 and the data line cross each other, and the TFT "T" of a switching element is disposed in a matrix and connected to the gate line 13 and the data line 15. The gate line 13 and the data line 15 define a pixel region "P" by crossing each other, and the TFT "T" is formed near a crossing portion of the gate line 13 and the data line 15. The pixel electrode 17 is formed of a transparent conductive material in the pixel region "P." The upper substrate 5 is referred to as a color filter substrate because the color filter layer 8 is formed thereon.

The upper and lower substrates 5 and 22 are attached with a seal pattern (not shown) through a liquid crystal cell process. The seal pattern keeps a cell gap of the LCD device 11 uniform and prevents leakage of liquid crystal material injected into a space between the upper and lower substrates 5 and 22. The seal pattern is formed using a screen-printing method or a dispensing method using a sealant. The sealant is made of a heat curable epoxy resin or an UV (ultra violet) curable epoxy resin. Even though the epoxy resin itself does not damage to the liquid crystal material, the epoxy includes an amine that may dissolve into the liquid crystal material. Accordingly, if the seal pattern is formed of a heat curable epoxy resin, a sufficient pre-baking step is necessary under a gradual increase of temperature after the sealant is printed.

FIG. 2 is a schematic plane view showing a seal pattern on an array substrate for a liquid crystal display device according to the background art. As shown in FIG. 2, a seal pattern 2 formed on an array substrate 22 may be divided into two portions: a main seal line 2a and an auxiliary seal line 2b. The main seal line 2a keeps the cell gap uniform and prevents leakage of the liquid crystal material. After the array substrate 22 and a color filter substrate (not shown) are attached, a cleaning step and an etching step for the attached substrates are performed. The auxiliary seal line 2b protects the main seal line 2a from the cleaning solution and the etching solution used during the cleaning and etching steps.

FIG. 3 is a schematic cross-sectional view, which is taken along a line III-III of FIG. 2, showing a thin film transistor and a seal pattern of a liquid crystal display device according to a first embodiment of the background art. For example, an inverted staggered-type switching element is used in FIG. 3.

In FIG. 3, a gate line 13 (of FIG. 1) and a gate electrode 32 protruding from the gate line 13 (of FIG. 1) are formed on a lower substrate 22. The gate line 13 (of FIG. 1) and the gate electrode 32 are formed of a metallic material such as aluminum (Al), chromium (Cr) or molybdenum (Mo). A gate insulating layer 33 as a first insulating layer is formed on the gate electrode 32. The gate insulating layer 33 is formed of an inorganic insulating material such as silicon nitride (SiNx) or silicon oxide ($SiO_2$). An active layer 36 of a semiconductor material is formed on the gate insulating layer 33 over the gate electrode 32. The active layer 36 has an island shape. Source and drain electrodes 39 and 41 are formed on the active layer 36. Even though not shown in FIG. 3, a data line 15 (of FIG. 1) crossing the gate line 13 (of FIG. 1) is simultaneously formed with the source and drain electrodes 39 and 41. The source electrode 39 is connected to the data line 15 (of FIG. 1) and the drain electrode 41 is spaced apart from the source electrode 39. The gate electrode 32, the active layer 36, the source electrode 39 and the drain electrode 41 constitute a thin film transistor (TFT) "T."

A passivation layer 35 of an organic insulating material such as benzocyclobutene (BCB) and/or acrylic resin is formed on the TFT "T." The passivation layer 35 has a drain contact hole 35a exposing the drain electrode 41. A pixel electrode 38 is formed on the passivation layer 35 and connects to the drain electrode 41 through the drain contact hole 35a.

The lower substrate 22 attaches to an upper substrate 5 with a seal pattern 2. The seal pattern 2 is disposed between a common electrode 18 of the upper substrate 5 and the passivation layer 35 of the lower substrate 22. Since the seal pattern 2 is formed from a heat curable epoxy resin, it has a poor adhesion to the passivation layer 35 formed from an organic material, and defects such as a breakdown of the seal pattern may occur. Moreover, a stain may form at a portion near the seal pattern 2 because the seal pattern 2 has low resistance to moisture or contaminants from outside the display. Further, since the area buffering stress is small, a thin film may peel or come off due to the stress. To improve the adhesion, a structure of the seal pattern according to another embodiment of the background art has been suggested.

FIG. 4 is a schematic cross-sectional view, which corresponds to a portion "F" of FIG. 3, showing a seal pattern of a liquid crystal display device according to a second embodiment of the background art. As shown in FIG. 4, a seal pattern 2 having a width "W" is formed on a passivation layer 35 over a lower substrate 22. To improve the adhesion of the seal pattern 2, the passivation layer 35 and a gate insulating layer 33 are formed to have a groove 37. As a result, the seal pattern 2 on the passivation layer 35 contacts the gate insulating layer 33 formed of an inorganic material through the groove 37. Since the contact area of the seal pattern 2 and the passivation layer 35 is reduced and the seal pattern 2 contacts the gate insulating layer 33, the adhesion is improved.

However, since the region for the seal pattern 2 is limited, considering the aperture ratio of the LCD device, sufficient adhesion is not obtained using the structure of FIG. 4. To increase the contact area in a limited region, a structure of the seal pattern according to another embodiment of the background art has been suggested.

FIG. 5 is a schematic cross-sectional view, which corresponds to a portion "F" of FIG. 3, showing a seal pattern of a liquid crystal display device according to a third embodiment of the background art. As shown in FIG. 5, a gate insulating layer 33 of an inorganic material and a passivation layer 35 of an organic material are sequentially formed on a lower substrate 22. A seal pattern 2 is formed on the passivation layer 35. Since the gate insulating layer 33 and the passivation layer 35 have multiple grooves 39, the seal pattern 2 contacts the gate insulating layer 33 through the multiple grooves 39. The adhesion of the seal pattern 2 to the gate insulating layer 33 is better than the adhesion to the passivation layer 35. Moreover, the seal pattern 2 contacts the gate insulating layer 33 not only at a bottom portion, but also at a side portion of each groove 39. Accordingly, as the number of the grooves 39 increases, the total contact area also increases. As a result, the total contact area of the seal pattern 2 in FIG. 5 is larger than that in FIG. 4.

However, since the seal pattern 2 also contacts the passivation layer 35, a liquid crystal layer may be contaminated due to a chemical reaction between the seal pattern 2 and the passivation layer 35 at a contact portion "C." Furthermore, the chemical reaction of the seal pattern 2 and the passivation layer 35 may cause a stain at a portion near the seal pattern 2 according to the curing degree of the passivation layer 35 and the chemical resistance of the seal pattern 2 under high temperature or high moisture conditions.

FIG. 6 is a photograph image showing a white stain of a liquid crystal display device constructed according to the background art. As shown in FIG. 6, a white stain "A" has generated at a periphery of the LCD device. Contamination of the liquid crystal layer due to a chemical reaction between the passivation layer and the seal pattern probably caused the white stain "A."

FIG. 7 is a schematic plane view showing a position of a white stain according to the background art. As shown in FIG. 7, multiple liquid crystal cells "L1" to "L4" are disposed in an original substrate and a white stain "A" occurs at an left lower portion of one of the first to third liquid crystal cells "L1" to "L3."

As has been shown, the chemical reactivity of the epoxy or acrylic seals tends to cause staining that results in the production of low quality liquid crystal displays. As a result, a technology that cleanly and effectively seals liquid crystal cells would be a great boon to the display industry.

SUMMARY OF THE INVENTION

The invention is directed to a liquid crystal display device and a fabricating method thereof, which substantially obviates one or more of problems due to limitations and disadvantages of the background art.

An object of the invention is to provide a liquid crystal display device, in which a breakdown of a seal pattern is prevented by improving the adhesion of the seal pattern, and a fabricating method thereof.

Another object of the invention is to provide a liquid crystal display device, in which a white stain due to contamination of a liquid crystal layer is prevented by shielding a seal pattern from a passivation layer of an organic material, and a fabricating method thereof.

The invention, in part, pertains to a liquid crystal display device that includes first and second substrates facing and spaced apart from each other, a first inorganic insulating layer over an inner surface of the first substrate, and a seal pattern between the first inorganic insulating layer and an inner surface of the second substrate, and the seal pattern contacts the first inorganic insulating layer.

The inventive display can have a second inorganic insulating layer on the inner surface of the first substrate, and an organic insulating layer between the first and second inorganic insulating layers. The first and second inorganic insulating layers can contain at least one inorganic material selected from the group consisting of silicon nitride ($SiN_x$), silicon oxide ($SiO_2$) and silicon oxynitride ($SiO_xN_y$). The organic insulating layer can contain at least one organic material selected from the group consisting of benzocyclobutene (BCB), acrylic resin and methacrylic resin.

In the invention, the second inorganic insulating layer can have at least one groove through the first inorganic insulating layer and the organic insulating layer. The seal pattern can contact the second inorganic insulating layer through the at least one groove. A bottom surface of the at least one groove can be uneven. The invention can further have a metal layer between the first substrate and the second inorganic insulating layer, and the seal pattern can contact the metal layer through the at least one groove. The device can further have a thin film transistor including a gate electrode, an active layer, a source electrode and a drain electrode on the first substrate, wherein the metal layer is the same layer as the gate electrode. Also, the second inorganic insulating layer can have at least one groove through the organic insulating layer, and the first inorganic insulating layer can contact the second inorganic insulating layer through the at least one groove. Also, a metal layer can be between the organic insulating layer and the second inorganic insulating layer.

The device can have at least one hole through the first inorganic insulating layer, and the seal pattern contacts the metal layer through the at least one hole. The device can further have a thin film transistor including a gate electrode, an active layer, a source electrode and a drain electrode on the first substrate, wherein the metal layer is the same layer as the source and drain electrodes.

In another aspect of the invention, a liquid crystal display device includes first and second substrates facing and spaced apart from each other, a pixel layer over an inner surface of the first substrate, and a seal pattern between the pixel layer and an inner surface of the second substrate, the seal pattern contacting the pixel layer. The device can further have an inorganic insulating layer on the inner surface of the first substrate, and an organic insulating layer between the inorganic insulating layer and the pixel layer. The device can also have a thin film transistor on the first substrate and a pixel electrode connected to the thin film transistor, wherein the pixel layer is the same layer as the pixel electrode.

The invention, in part, pertains to a fabricating method of a liquid crystal display device that includes forming a thin film transistor on a first substrate, forming a passivation layer covering the thin film transistor and including an organic material, forming an inorganic insulating layer on the passivation layer, forming a seal pattern surrounding the thin film transistor, and attaching a second substrate to the first substrate such that the seal pattern contacts the inorganic insulating layer and the second substrate.

In another aspect, a fabricating method of a liquid crystal display device includes forming a thin film transistor on a first substrate, forming a passivation layer covering the thin film transistor and including an organic material, forming a pixel electrode and a pixel layer on the passivation layer, the pixel electrode being connected to the thin film transistor, forming a seal pattern surrounding the thin film transistor, and attaching a second substrate to the first substrate such that the seal pattern contacts the pixel layer and the second substrate.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the illustrated embodiment of the invention, which is illustrated in the accompanying drawings. Wherever possible, similar reference numbers will be used throughout the drawings to refer to the same or like parts.

Figure 1:
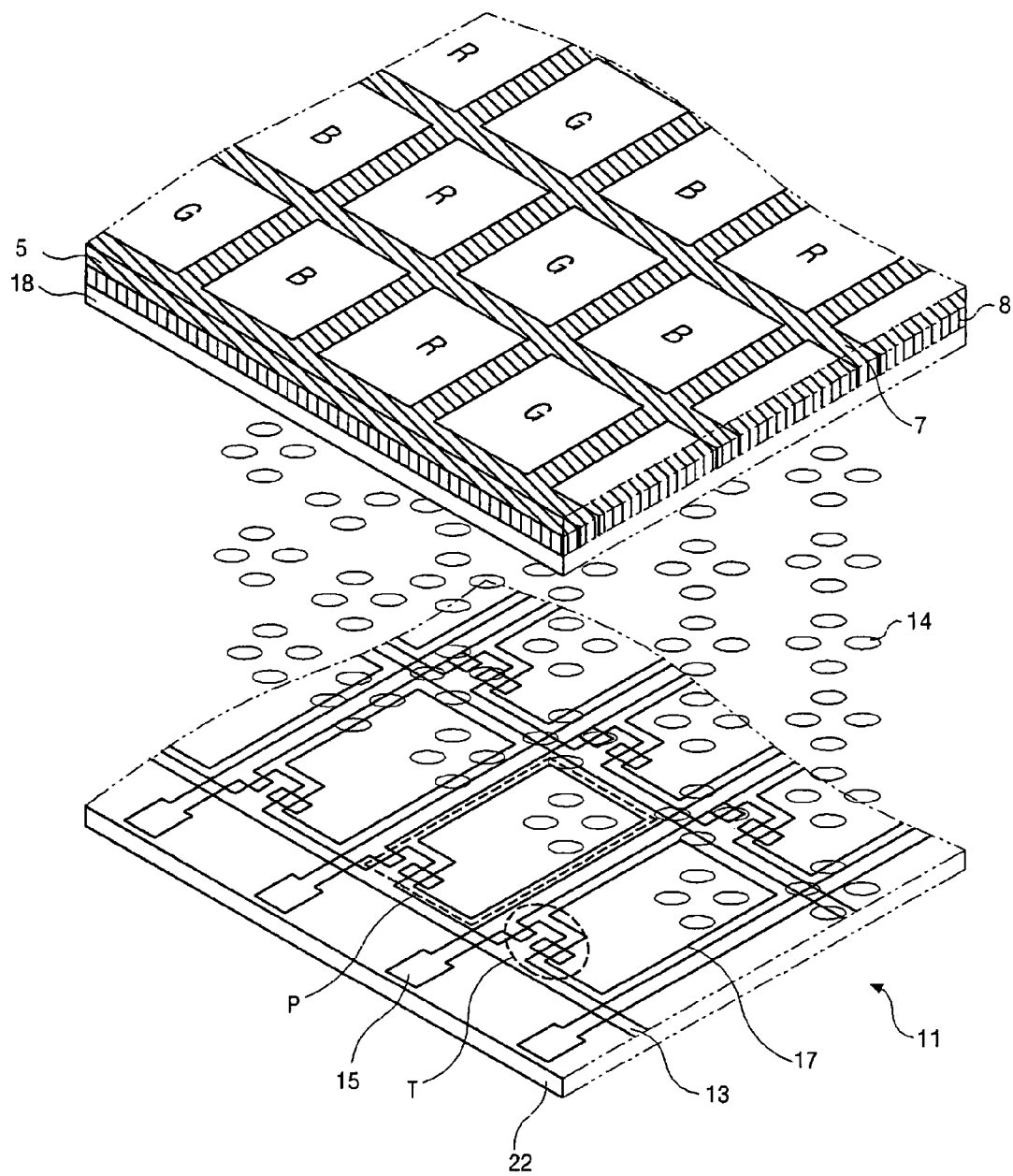
FIG. 1 is an exploded perspective view of a liquid crystal display (LCD) device according to the background art.
Figure 2:
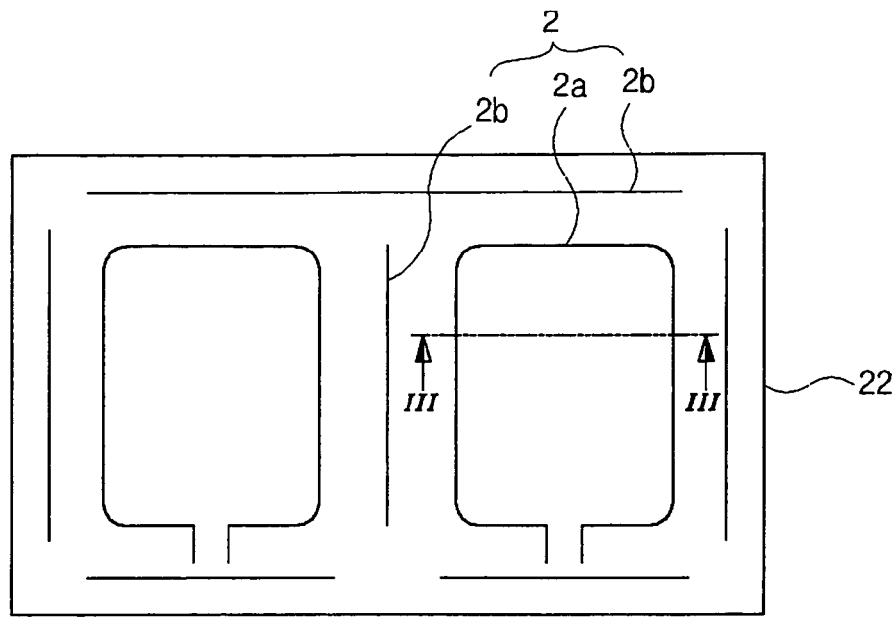
FIG. 2 is a schematic plane view showing a seal pattern on an array substrate for a liquid crystal display device according to the background art.
Figure 3:
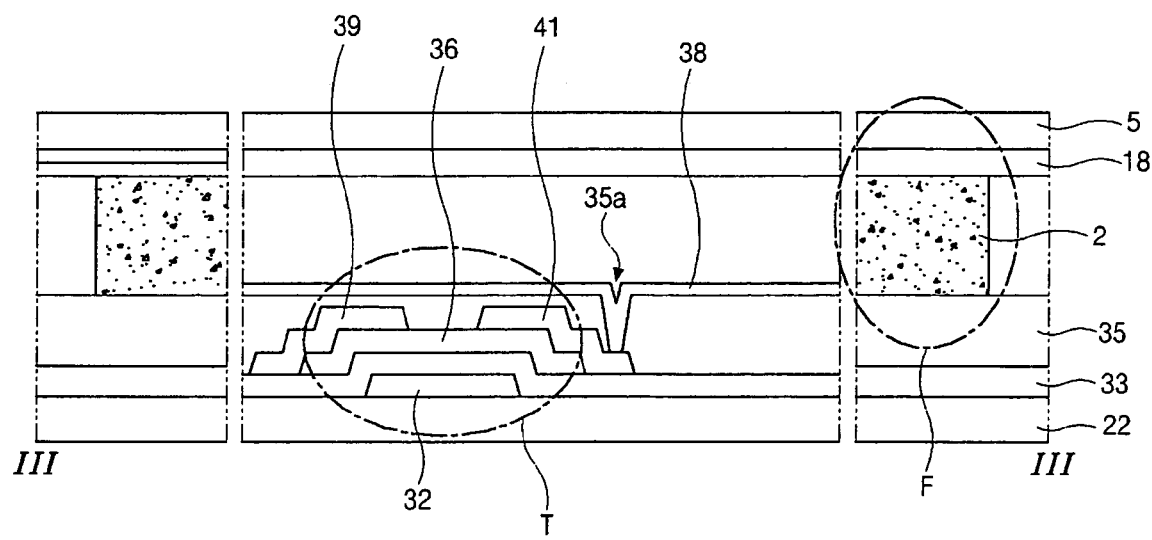
FIG. 3 is a schematic cross-sectional view, which is taken along a line III-III of FIG. 2, showing a thin film transistor and a seal pattern of a liquid crystal display device according to a first embodiment of the background art.
Figure 4:
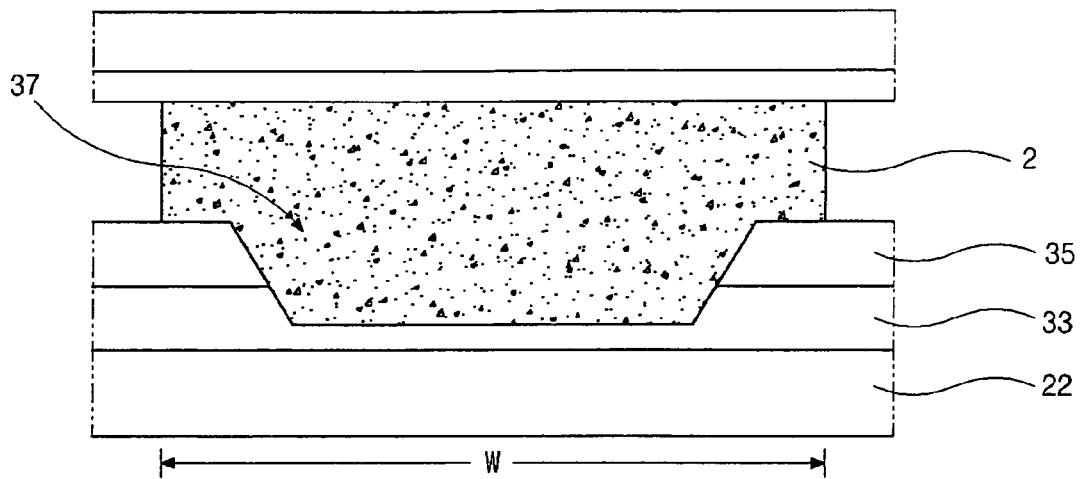
FIG. 4 is a schematic cross-sectional view, which corresponds to a portion "F" of FIG. 3, showing a seal pattern of a liquid crystal display device according to a second embodiment of the background art.
Figure 5:
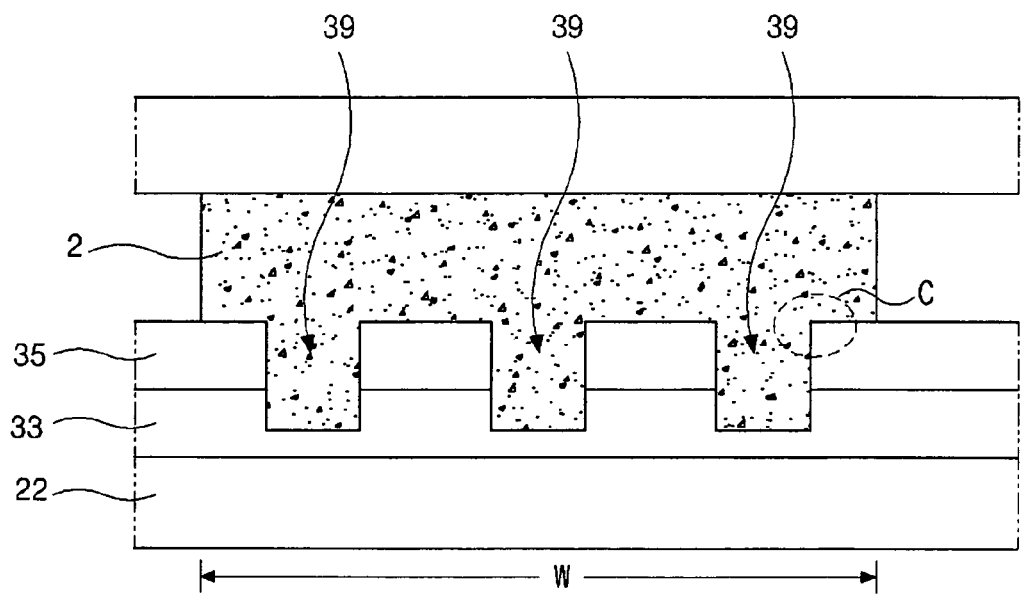
FIG. 5 is a schematic cross-sectional view, which corresponds to a portion "F" of FIG. 3, showing a seal pattern of a liquid crystal display device according to a third embodiment of the background art.
Figure 6:
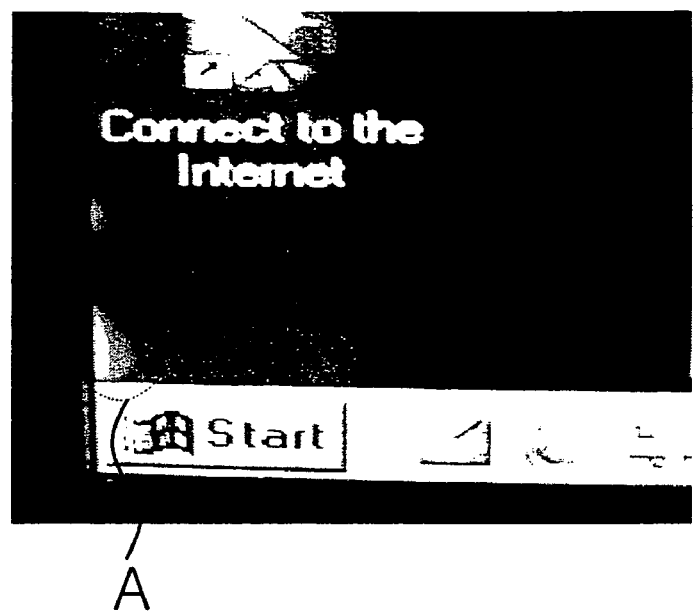
FIG. 6 is a photograph image showing a white stain of a liquid crystal display device according to the background art.
Figure 7:
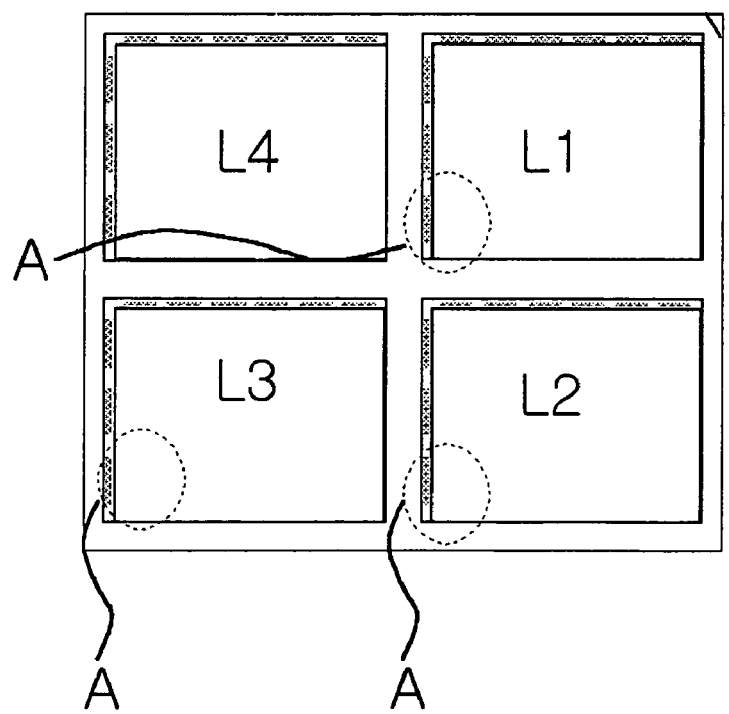
FIG. 7 is a schematic plane view showing a position of a white stain according to the background art.
Figure 8:
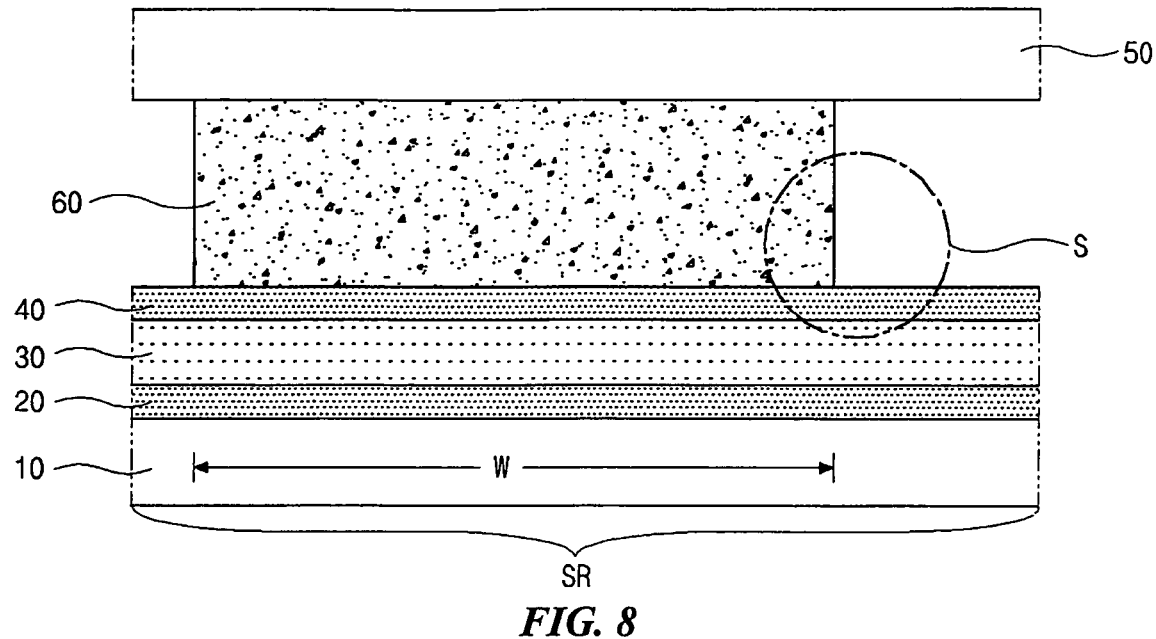
FIG. 8 is a schematic cross-sectional view, which corresponds to a portion "F" of FIG. 3, showing a seal pattern of a liquid crystal display device according to a first embodiment of the invention.

FIG. 8 is a schematic cross-sectional view, which corresponds to a portion "F" of FIG. 3, showing a seal pattern of a liquid crystal display device according to a first embodiment of the invention.

FIG. 8 shows a first inorganic insulating layer 20, an organic insulating layer 30 and a second inorganic insulating layer 40 that are sequentially formed on a first substrate 10 in a seal pattern region "SR." The first and second inorganic insulating layers 20 and 40 may be formed of an inorganic material such as silicon nitride ($SiN_x$), silicon oxide ($SiO_2$) or silicon oxynitride ($SiO_xN_y$), while the organic insulating layer 30 may be formed of at least one organic material such as benzocyclobutene (BCB), acrylic resin or methacrylic resin. A second substrate 50 faces and is spaced apart from the first substrate 10, and a seal pattern 60 is formed between the second inorganic insulating layer 40 and the second substrate 50. The first and second substrates 10 and 50 are attached with the seal pattern 60. Moreover, the seal pattern 60 prevents leakage of the injected liquid crystals.

Since the seal pattern 60 does not contact the organic insulating layer 30 but does contact the second inorganic insulating layer 40, adhesion of the seal pattern 60 is improved and a stain at a periphery "S" of the seal pattern 60 due to contamination of a liquid crystal layer is prevented. In a conventional art structure, since the seal pattern is formed on the organic insulating layer, adhesion of the seal pattern is poor and defects such as breakdown of the seal pattern occurs. Moreover, the liquid crystal layer becomes contaminated by a chemical reaction of the seal pattern with the organic insulating layer, and a white stain due to the contamination of the liquid crystal layer is generated at a periphery of the seal pattern. In the first embodiment of the invention, however, since the seal pattern 60 forms contacting the second inorganic insulating layer 40, adhesion of the seal pattern 60 improves. In addition, since the second inorganic insulating layer 40 is formed between the seal pattern 60 and the organic insulating layer 30, the seal pattern 60 does not contact the organic insulating layer 30 and does not chemically react with the organic insulating layer 30. Accordingly, contamination of the liquid crystal layer is prevented and one observes no white stain at the periphery of the seal pattern 60.

FIG. 8 does not show that the first inorganic insulating layer 20 may optionally be formed to be the same layer as a gate insulating layer of a thin film transistor (TFT) on the first substrate 10, and the organic insulating layer 30 may be formed to be the same layer as a passivation layer covering the TFT.

FIGS. 9A to 9E are schematic cross-sectional views, which correspond to a portion "F" of FIG. 3, showing a forming process of a seal pattern of a liquid crystal display device according to a second embodiment of the invention.

Figure 9A:
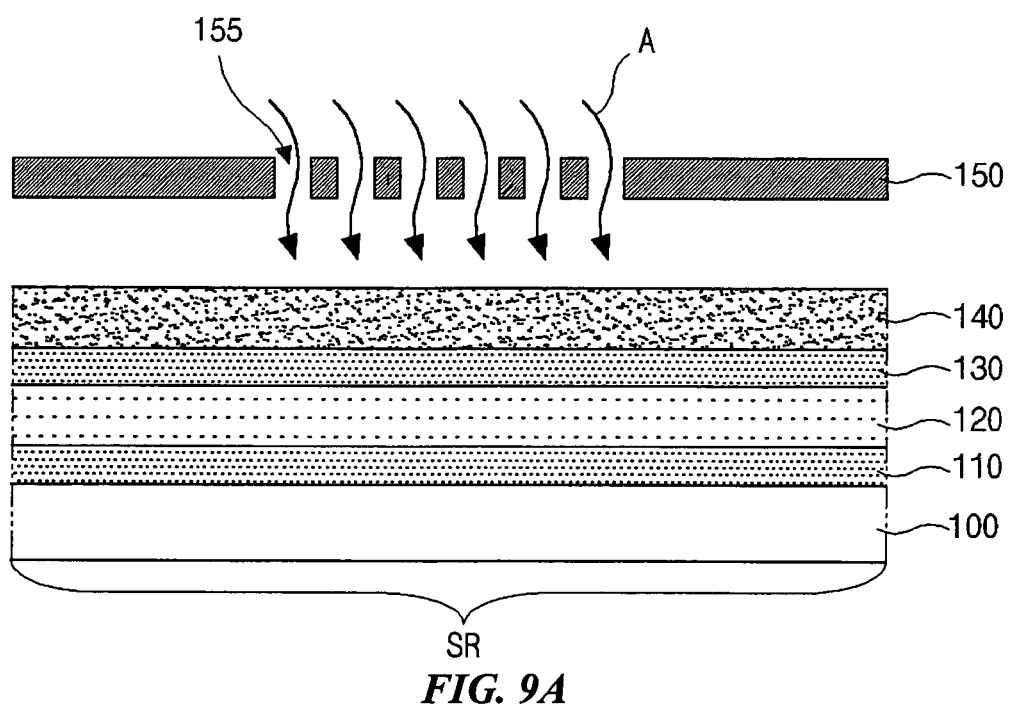
FIGS. 9A to 9E are schematic cross-sectional views, which correspond to a portion "F" of FIG. 3, showing a forming process of a seal pattern of a liquid crystal display device according to a second embodiment of the invention.

FIG. 9A shows a first inorganic insulating layer 110, an organic insulating layer 120 and a second inorganic insulating layer 130 that are sequentially formed on a first substrate 100. The first and second inorganic insulating layers 110 and 130 may be formed of an inorganic material such as silicon nitride ($SiN_x$) and silicon oxide ($SiO_2$), and the organic insulating layer 120 may be formed of an organic material such as benzocyclobutene (BCB), acrylic resin, or methacrylic resins. The invention, however, is not restricted to the aforesaid organic and inorganic materials, and any suitable material may be used to from the organic and inorganic layers. Even though not shown in FIG. 9A, the first inorganic insulating layer 110 may be formed to be the same layer as a gate insulating layer of a thin film transistor (TFT) on the first substrate 100, and the organic insulating layer 120 may be formed to be the same layer as a passivation layer covering the TFT.

A photoresist (PR) layer 140 is formed on the second inorganic insulating layer 130 and a mask 150 having a slit 155 is disposed over the PR layer 140 such that the slit 155 corresponds to a seal pattern region "SR" where a seal pattern is formed through a subsequent process. The photoresist can be a positive or negative photoresist. Next, light "A" is irradiated onto the PR layer 140 through the mask 150. The light diffracts and interferes while passing through the slit 155, and the intensity of the light irradiated onto the seal pattern region "SR" is thus reduced. Accordingly, the PR layer 140 in the seal pattern region "SR" corresponding to the slit 155 is partially exposed and is not entirely removed after developing the PR layer 140. A mask having a semi-transmissive portion, which has a transmittance greater than 0% and less than 100%, instead of the slit 155 may be optionally used in another embodiment.

Figure 9B:
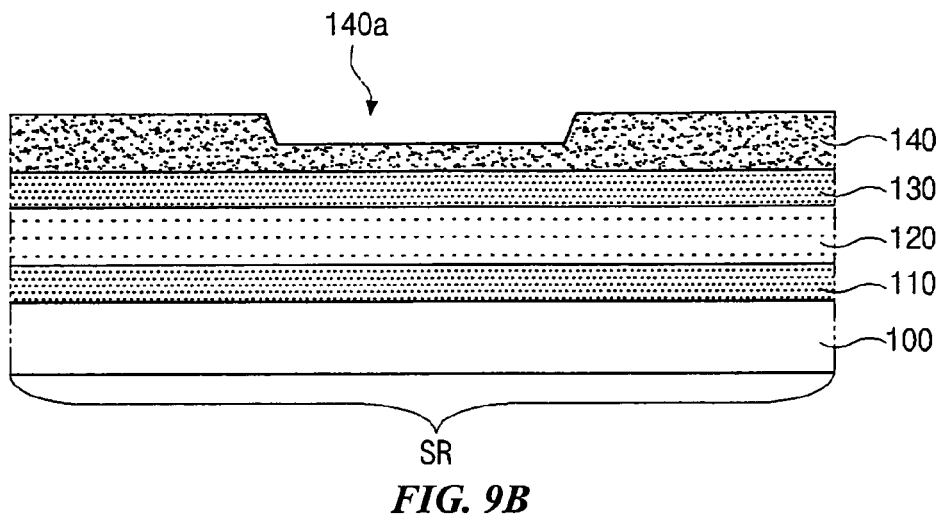

FIG. 9B shows that after a developing step, the PR layer 140 is partially removed in the seal pattern region "SR" corresponding to the slit 155 (of FIG. 9A) to leave a first groove 140a. A bottom surface of the PR layer 140 in the seal pattern region "SR" may have unevenness according to the width of the slit 155. When a mask having a transmissive portion is used in another embodiment, the PR layer 140 in the seal pattern region "SR" may be entirely removed to expose the second inorganic insulating layer 130.

Figure 9C:
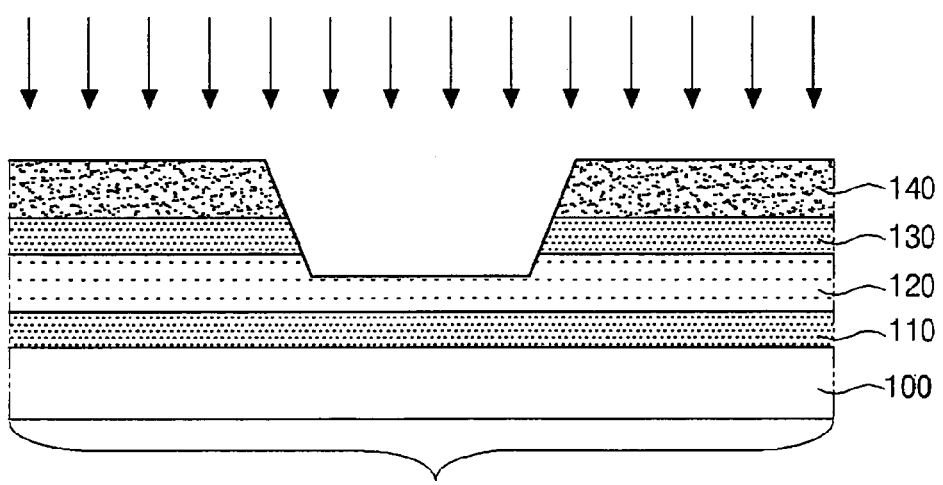

FIG. 9C shows that the PR layer 140, the second inorganic insulating layer 130 and the organic insulating layer 120 may be etched through a dry etching method. A typical dry etching method is reactive ion etch (RIE) or plasma etch.

Figure 9D:
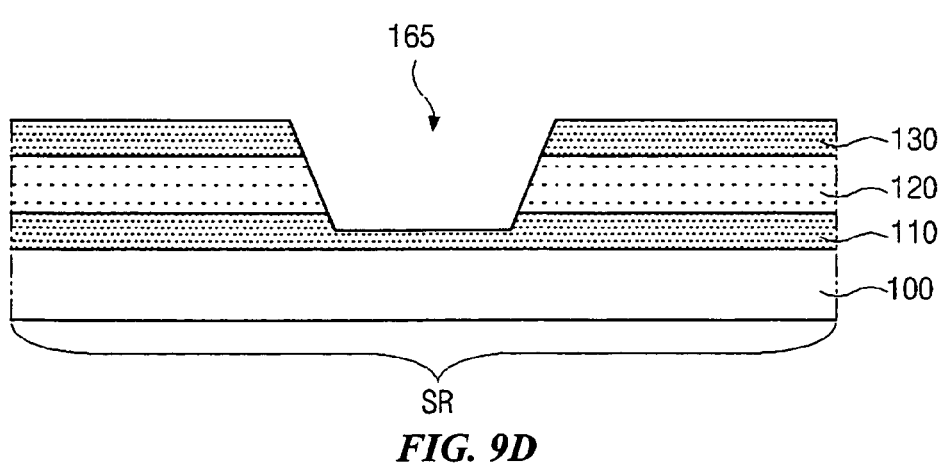

FIG. 9D shows that the first inorganic insulating layer 110 may be etched until the PR layer 140 (of FIG. 9C) is entirely removed and a second groove 165 is formed through the first inorganic insulating layer 110, the organic insulating layer 120 and the second inorganic insulating layer 130. Even though the first inorganic insulating layer 110 remains in the seal pattern-region "SR" corresponding to the slit 155 (of FIG. 9A) in this embodiment, the first inorganic insulating layer 110 of the seal pattern region "SR" may be entirely etched according to an etching condition that exposes the first substrate 100 through the second groove 165 in another embodiment.

Figure 9E:
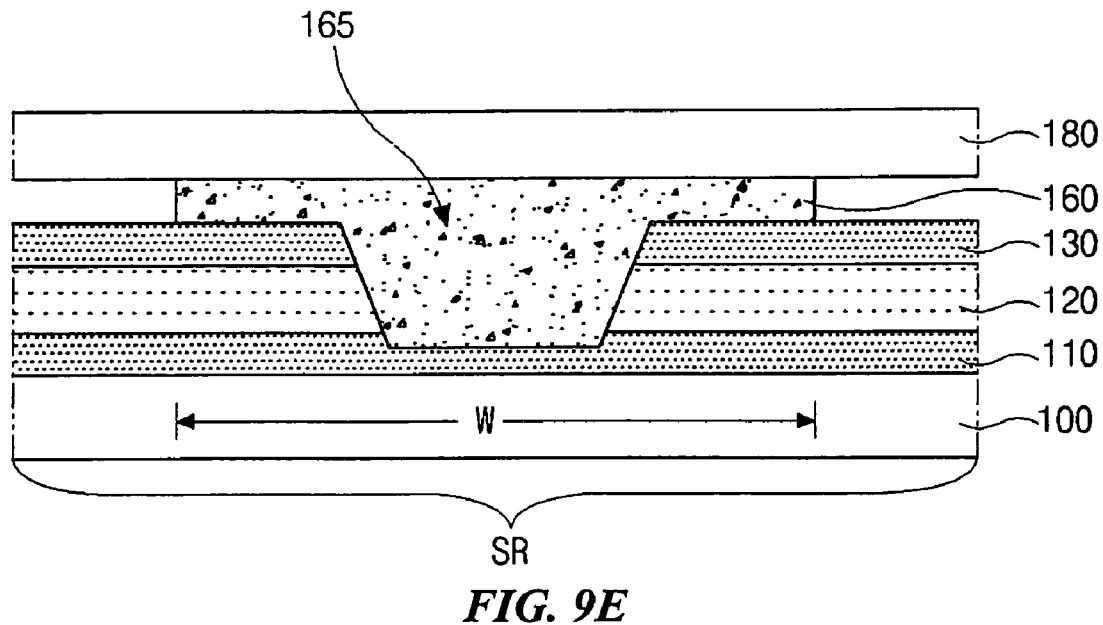

FIG. 9E shows the formation of a seal pattern 160 on the second inorganic insulating layer 130 in the seal pattern region "SR." The seal pattern 160 contacts the first inorganic insulating layer 110 (or the first substrate 100 in another embodiment) through a second groove 165. The second groove 165 may be disposed to avoid a plurality of lines such as a gate line, a data line and a link line (not shown) crossing the seal pattern region "SR." Moreover, the second groove 165 has a width equal to or less than that width "W" of the seal pattern 160. A second substrate 180 is attached to the first substrate 100 using the seal pattern 160.

In the second embodiment, since the most seal pattern 160 contacts the first and second inorganic insulating layers 110 and 130, adhesion of the seal pattern 160 is improved. In addition, since a chemical reaction between the seal pattern 160 and the organic insulating layer 120 is inhibited, contamination of the liquid crystal layer is prevented. Accordingly, a stain near the seal pattern 160 is also prevented.

However, even though having a small area, the seal pattern 160 contacts the organic insulating layer 120 at a sidewall of the second groove 165. Accordingly, a chemical reaction between the seal pattern 160 and the organic insulating layer 120 is not completely prevented. A third embodiment of the invention improves the chemical interaction between the seal pattern 160 and the organic insulating layer.

FIGS. 10A to 10F are schematic cross-sectional views, which correspond to a portion "F" of FIG. 3, showing a forming process of forming a seal pattern of a liquid crystal display device according to a third embodiment of the invention.

Figure 10A:
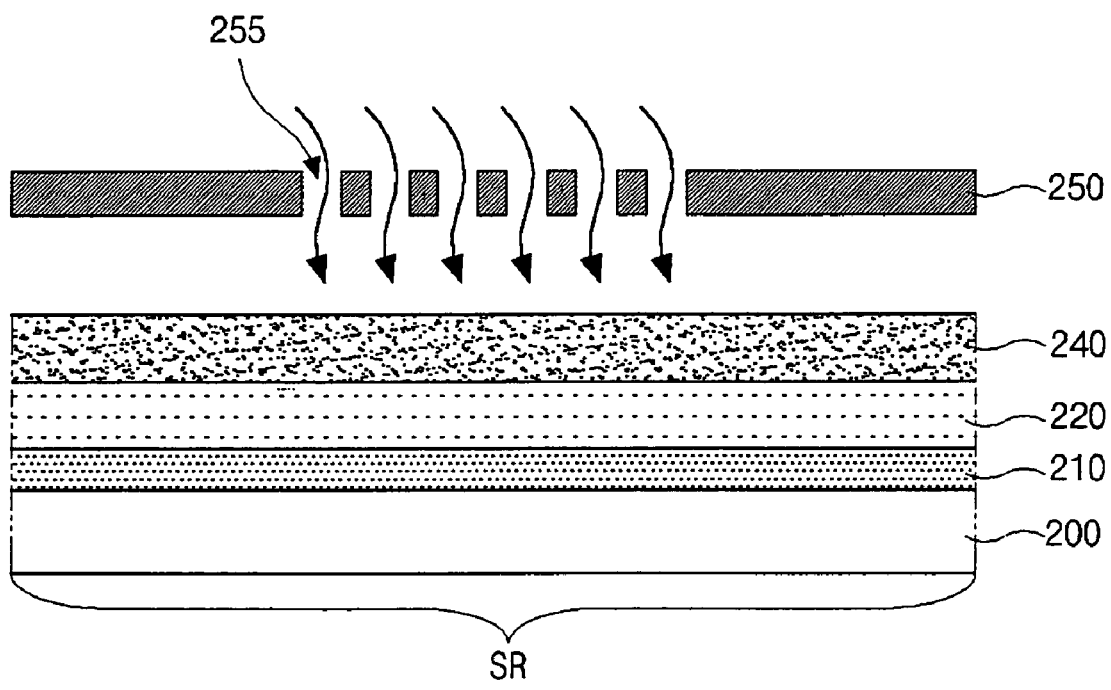
FIGS. 10A to 10F are schematic cross-sectional views, which correspond to a portion "F" of FIG. 3, showing a forming process of a seal pattern of a liquid crystal display device according to a third embodiment of the invention.

FIG. 10A shows a first inorganic insulating layer 210 and an organic insulating layer 220 that are sequentially formed on a first substrate 200. Even though not shown in FIG. 10A, the first inorganic insulating layer 210 may be formed to be the same layer as a gate insulating layer of a thin film transistor (TFT) on the first substrate 200 and the organic insulating layer 220 may be formed to be the same layer as a passivation layer covering the TFT. The first inorganic insulating layer 210 may be formed of an inorganic material such as silicon nitride ($SiN_x$), silicon oxide ($SiO_2$) or silicon oxynitride ($SiO_xN_y$), and the organic insulating layer 220 may be formed of an organic material such as benzocyclobutene (BCB), acrylic resin or methacrylic resin.

A PR layer 240 is formed on the organic insulating layer 220 and a mask 250 having a slit 255 is disposed over the PR layer 240 such that the slit 255 corresponds to a seal pattern region "SR", where a seal pattern is formed through a subsequent process. Next, light is irradiated onto the PR layer 240 through the mask 250. Since the light diffracts and interferes while passing through the slit 255, the intensity of the light irradiated onto the seal pattern region "SR" decreases. Accordingly, the PR layer 240 in the seal pattern region "SR" corresponding to the slit 255 is partially exposed and is not entirely removed after developing the PR layer 240. A mask having a half-transmissive portion, which has a transmittance greater than 0% and less than 100%, instead of the slit 155 may optionally be used for an exposure step in another embodiment.

Figure 10B:
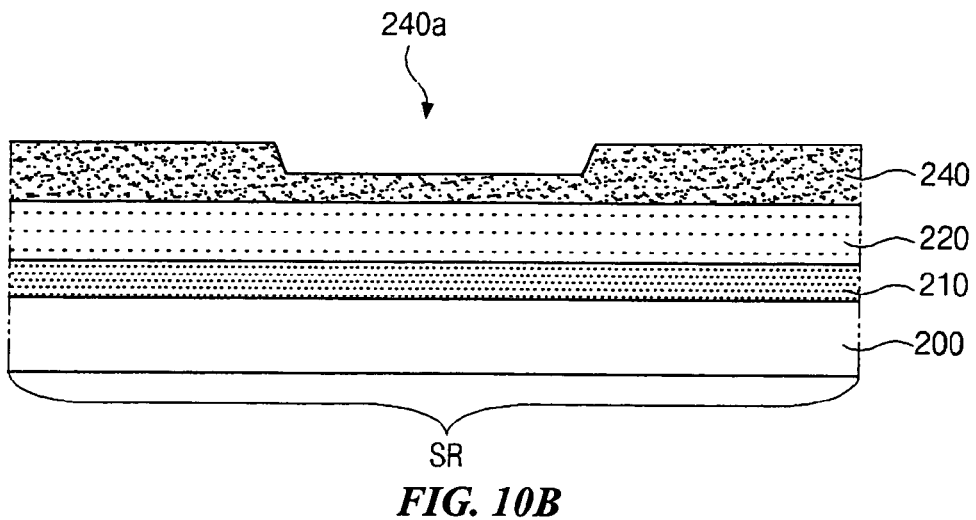

In FIG. 10B, after a developing step, the PR layer 240 is partially removed in the seal pattern region "SR" corresponding to the slit 255 (of FIG. 10A) to have a first groove 240a. A bottom surface of the PR layer 240 in the seal pattern region "SR" may have unevenness according to a width of the slit 255. When a mask having a transmissive portion is used in another embodiment, the PR layer 140 in the seal pattern region "SR" may be entirely removed to expose the organic insulating layer 220.

Figure 10C:
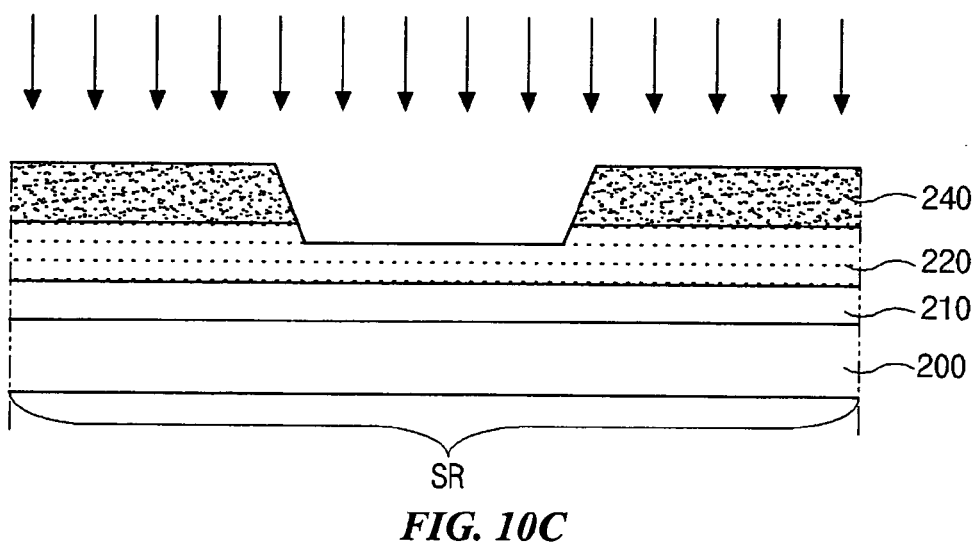

FIG. 10C shows that the PR layer 240 and the organic insulating layer 220 may be etched through a dry etching method. The dry etching method may typically be reactive ion etch (RIE) or plasma etch. The PR layer 240 may have an etching rate similar to that of the organic insulating layer 220.

Figure 10D:
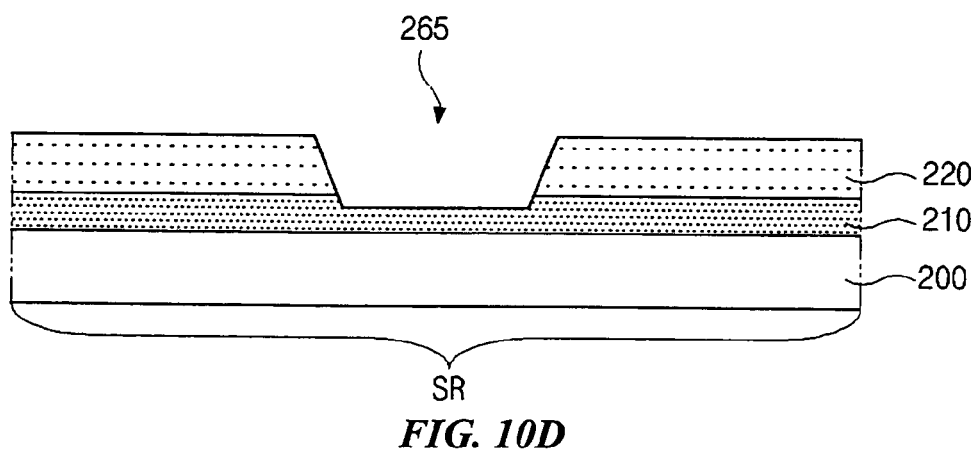

In FIG. 10D, the first inorganic insulating layer 210 may be etched until the PR layer 240 (of FIG. 10C) is entirely removed, and a second groove 265 forms through the first inorganic insulating layer 230 and the organic insulating layer 220. Even though the first inorganic insulating layer 210 remains in the seal pattern region "SR" corresponding to the slit 255 (of FIG. 10A) in this embodiment, the first inorganic insulating layer 210 of the seal pattern region "SR" may be entirely etched according to an etching condition that will expose the first substrate 200 through the second groove 265 in another embodiment.

Figure 10E:
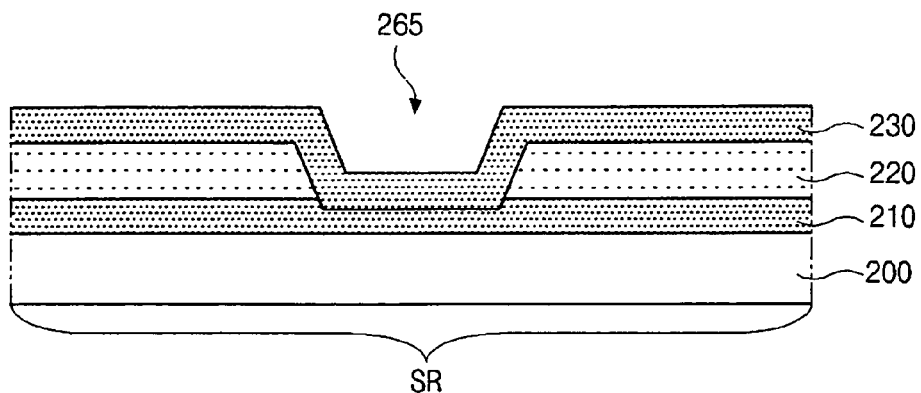

FIG. 10E shows a second inorganic insulating layer 230 being formed on the organic insulating layer 220. The second inorganic insulating layer 230 may be formed of an inorganic material such as silicon nitride ($SiN_x$), silicon oxide ($SiO_2$) or silicon oxynitride ($SiO_xN_y$). The second inorganic insulating layer 230 contacts the first inorganic insulating layer 210 (or the first substrate 200 in another embodiment) through the second groove 265.

Figure 10F:
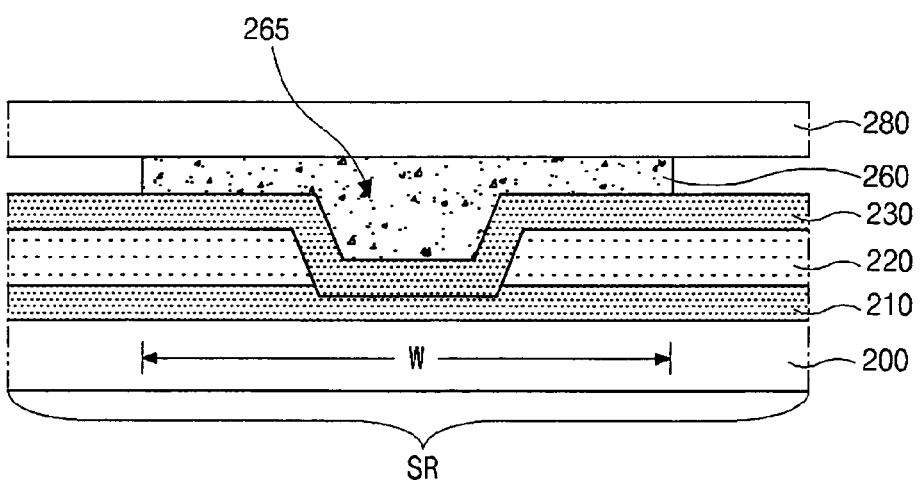

FIG. 10F shows a seal pattern 260 being formed on the second inorganic insulating layer 230 in the seal pattern region "SR." The second groove 265 may be disposed to avoid a plurality of lines such as a gate line, a data line and a link line (not shown) crossing the seal pattern region "SR." Moreover, the second groove 265 has a width equal to or less than that width "W" of the seal pattern 260. A second substrate 280 attaches to the first substrate 200 using the seal pattern 260.

In the third embodiment, since the seal pattern 260 contacts the second inorganic insulating layer 230, the adhesion of the seal pattern 260 improves. In addition, since the seal pattern 260 does not contact the organic insulating layer 220, the seal pattern 260 does not chemically react with the organic insulating layer 220. Accordingly, contamination of a liquid crystal layer is prevented and a stain near the seal pattern 260 is not observed in an LCD device.

FIGS. 11A to 11D show schematic cross-sectional views, which correspond to a portion "F" of FIG. 3, depicting a forming process of a seal pattern of a liquid crystal display device according to a fourth embodiment of the invention.

Figure 11A:
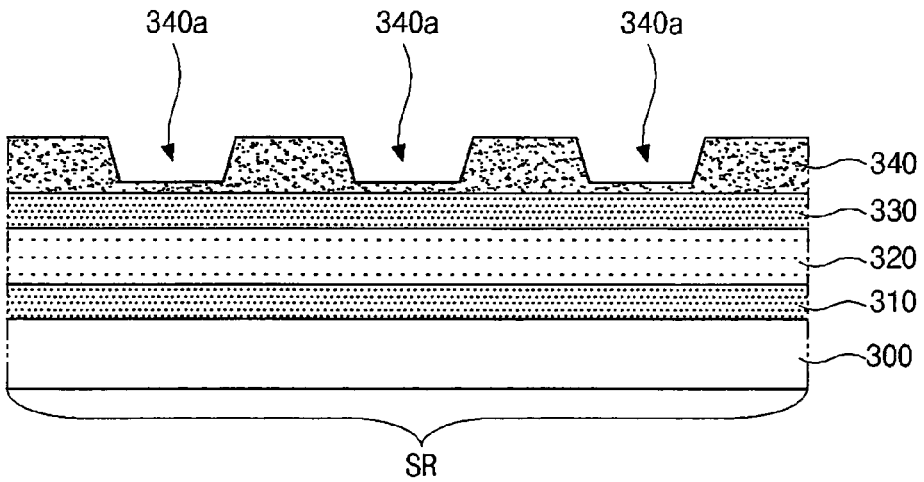
FIGS. 11A to 11D are schematic cross-sectional views, which correspond to a portion "F" of FIG. 3, showing a forming process of a seal pattern of a liquid crystal display device according to a fourth embodiment of the invention.

FIG. 11A shows a first inorganic insulating layer 310, an organic insulating layer 320 and a second inorganic insulating layer 330 that are sequentially formed on a first substrate 300. The first and second inorganic insulating layers 310 and 330 may be formed of an inorganic material such as silicon nitride ($SiN_x$), silicon oxide ($SiO_2$) or silicon oxynitride ($SiO_xN_y$), and the organic insulating layer 320 may be formed of an organic material such as benzocyclobutene (BCB), acrylic resin or methacrylic resin. Even though not shown in FIG. 11A, the first inorganic insulating layer 310 may be formed to be the same layer as a gate insulating layer of a thin film transistor (TFT) on the first substrate 300, and the organic insulating layer 320 may be formed to be the same layer as a passivation layer covering the TFT.

A PR layer 340 having multiple first grooves 340a is formed on the second inorganic insulating layer 330 through a photolithographic process. Even though not shown in FIG. 11A, after a mask having a slit or a half-transmissive portion is disposed over the PR layer 340 such that the slit or the half-transmissive portion corresponds to a seal pattern region "SR" (where the seal pattern is formed through a subsequent process), light is irradiated onto the PR layer 340 through the mask, and then the PR layer 340 is developed to form the multiple first grooves 340a. The PR layer 340 in the plurality of first grooves 340a may be entirely removed to expose the second inorganic insulating layer 330 in another embodiment. A bottom surface of the PR layer 340 in the multiple first grooves 340a may have unevenness according to the width of the slit.

Figure 11B:
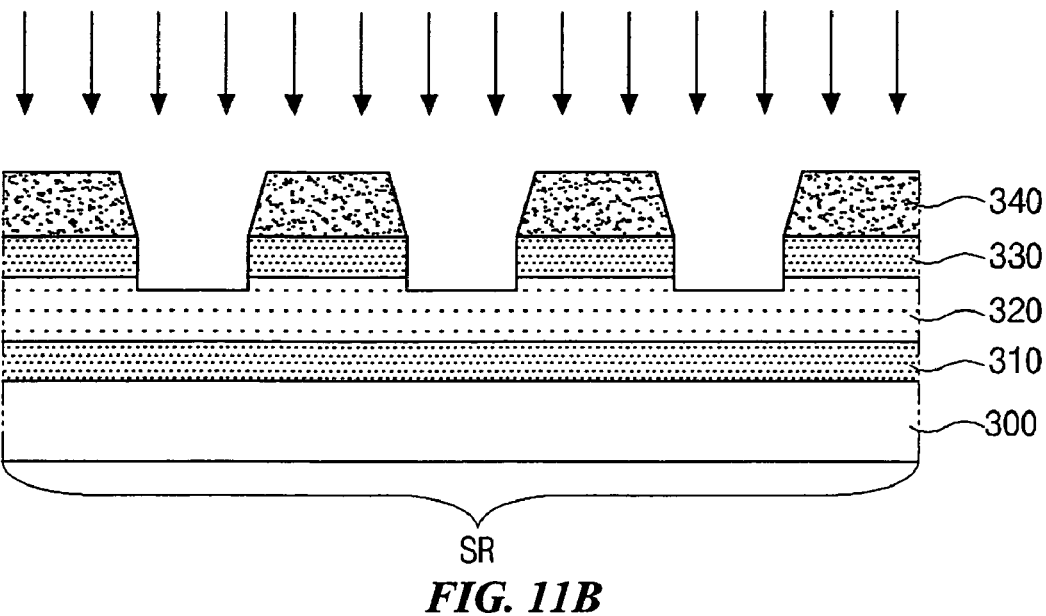

In FIG. 11B, the PR layer 340, the second inorganic insulating layer 330 and the organic insulating layer 320 may be etched through a dry etching method. The dry etching method may be reactive ion etch (RIE) or plasma etch, but is not restricted to these methods, and any appropriate dry etching method can be used.

Figure 11C:
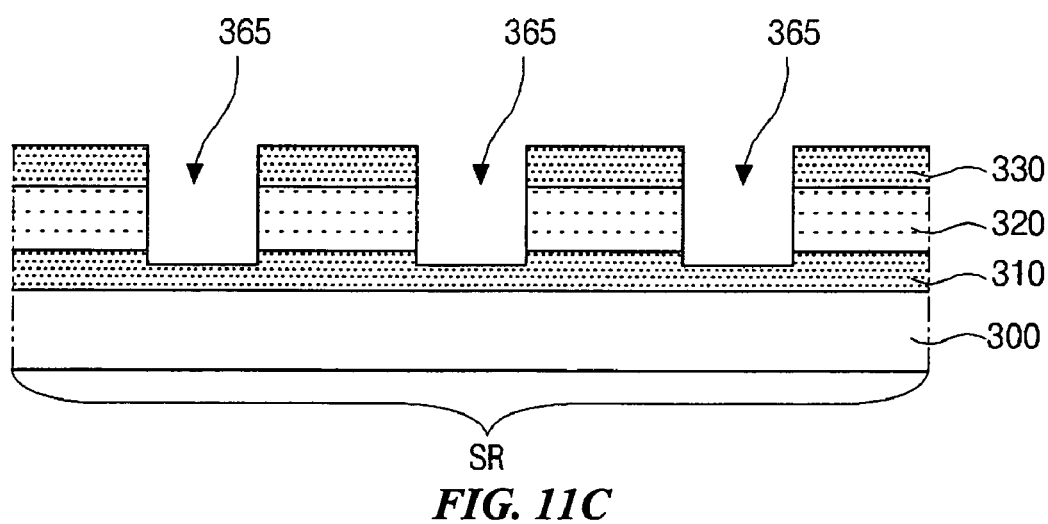

FIG. 11C shows that the first inorganic insulating layer 310 may be etched until the PR layer 340 (of FIG. 11B) is entirely removed and multiple second grooves 365 are formed through the first inorganic insulating layer 310, the organic insulating layer 320 and the second inorganic insulating layer 330. Even though the first inorganic insulating layer 310 remains corresponding to the multiple second grooves 365 in this embodiment, the first inorganic insulating layer 310 corresponding to the plurality of second grooves 365 may be entirely removed according to an etching condition that exposes the first substrate 300 in accordance with another embodiment of the invention.

Figure 11D:
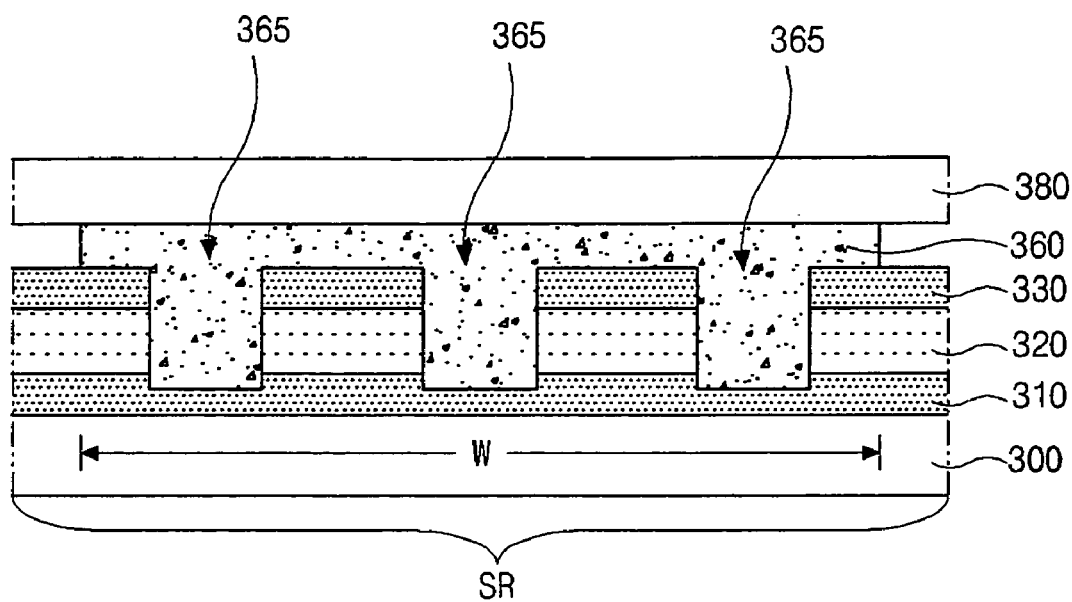

FIG. 11D shows the formation of a seal pattern 360 on the second inorganic insulating layer 330 in the seal pattern region "SR". The seal pattern 360 contacts the first inorganic insulating layer 310 (or the first substrate 300 in another embodiment) through the multiple second grooves 365. The multiple second grooves 365 may be disposed to avoid multiple lines, such as a gate line, a data line and a link line (not shown), crossing the seal pattern region "SR." Moreover, the seal pattern 360 has a width "W" to cover the multiple second grooves 365. A second substrate 380 is attached to the first substrate 300 using the seal pattern 360.

In the fourth embodiment, since most of the seal pattern 360 contacts the first and second inorganic insulating layers 310 and 330, adhesion of the seal pattern 360 improves. Moreover, since the seal pattern 360 contacts the first inorganic insulating layer 310, the organic insulating layer 320 and the second inorganic insulating layer 330 at sidewalls of the plurality of second grooves 365, the total contact area of the seal pattern 360 increases. Therefore, the adhesion of the seal pattern 360 further improves. In addition, since a chemical reaction between the seal pattern 360 and the organic insulating layer 320 is restrained, contamination of the liquid crystal layer is prevented. Accordingly, a stain near the seal pattern 360 is also prevented.

However, since the seal pattern 360 contacts the organic insulating layer 320 at sidewalls of the multiple second grooves 365, a chemical reaction between the seal pattern 360 and the organic insulating layer 320 is not completely prevented. A fifth embodiment for preventing a chemical reaction between the seal pattern 360 and the organic insulating layer 320 is illustrated.

FIGS. 12A to 12E are schematic cross-sectional views, which correspond to a portion "F" of FIG. 3, showing a forming process of a seal pattern of a liquid crystal display device according to a fifth embodiment of the invention.

Figure 12A:
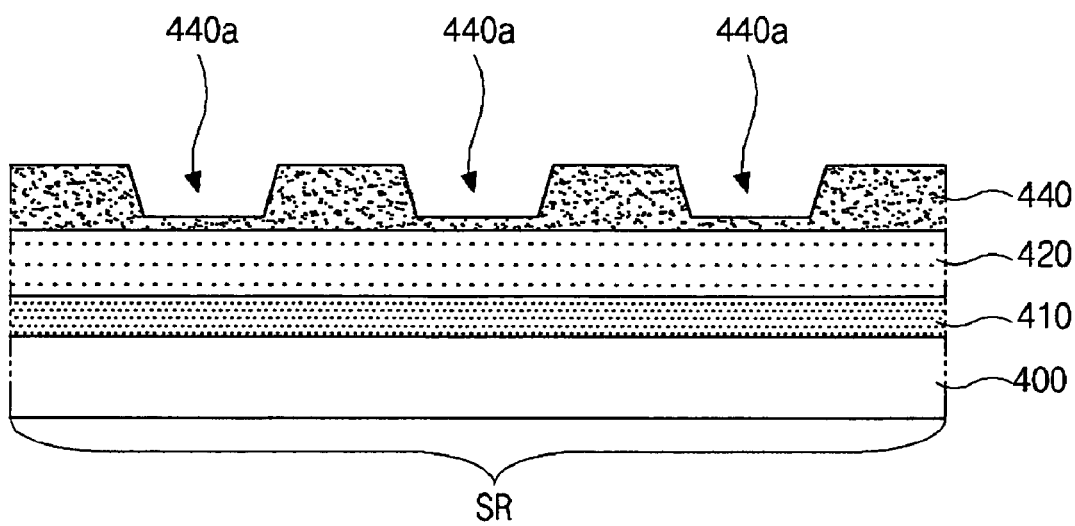
FIGS. 12A to 12E are schematic cross-sectional views, which correspond to a portion "F" of FIG. 3, showing a forming process of a seal pattern of a liquid crystal display device according to a fifth embodiment of the invention.

FIG. 12A shows a first inorganic insulating layer 410 and an organic insulating layer 420 that are sequentially formed on a first substrate 400. Even though not shown in FIG. 12A, the first inorganic insulating layer 210 may optionally be formed to be the same layer as a gate insulating layer of a thin film transistor (TFT) on the first substrate 400, and the organic insulating layer 420 may optionally be formed to be the same layer as a passivation layer covering the TFT. The first inorganic insulating layer 410 may be formed of an inorganic material such as silicon nitride (SiN$_x$), silicon oxide (SiO$_2$) or silicon oxynitride (SiO$_x$N$_y$), and the organic insulating layer 420 may be formed of an organic material such as benzocyclobutene (BCB), acrylic resin or methacrylic resin.

A PR layer 440 having multiple first grooves 440a is formed on the organic insulating layer 420 through a photolithographic process. Even though not shown in FIG. 12A, after a mask having a slit or a half-transmissive portion is disposed over the PR layer 440 (such that the slit or the half-transmissive portion corresponds to a seal pattern region "SR", where the seal pattern is formed through a subsequent process), light is irradiated onto the PR layer 440 through the mask. Then the PR layer 440 is developed to form multiple first grooves 440a. The PR layer 440 in the multiple first grooves 440a may be entirely removed to expose the organic insulating layer 420 in another embodiment. A bottom surface of the PR layer 440 in the multiple first grooves 440a may have unevenness according to a width of the slit.

Figure 12B:
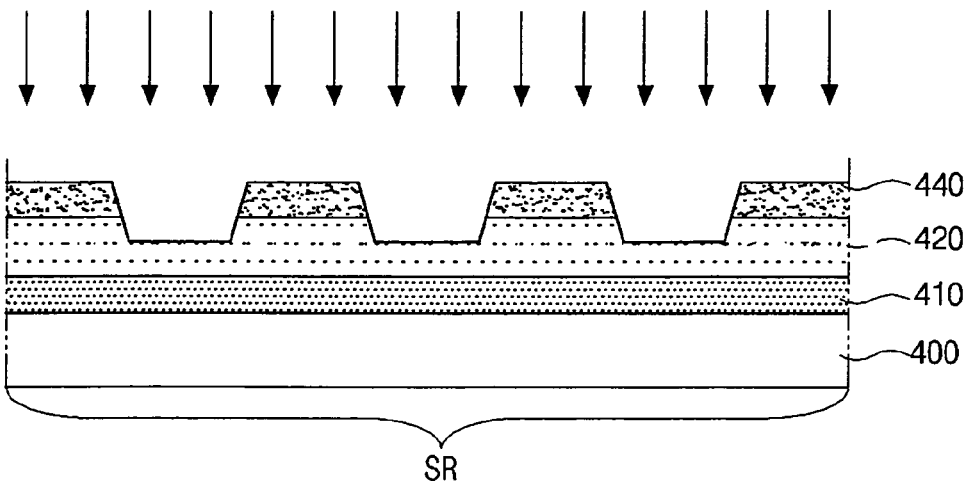

In FIG. 12B, the PR layer 440 and the organic insulating layer 420 may be etched through a dry etching method. Typical dry etching methods include reactive ion etch (RIE) or plasma etch.

Figure 12C:
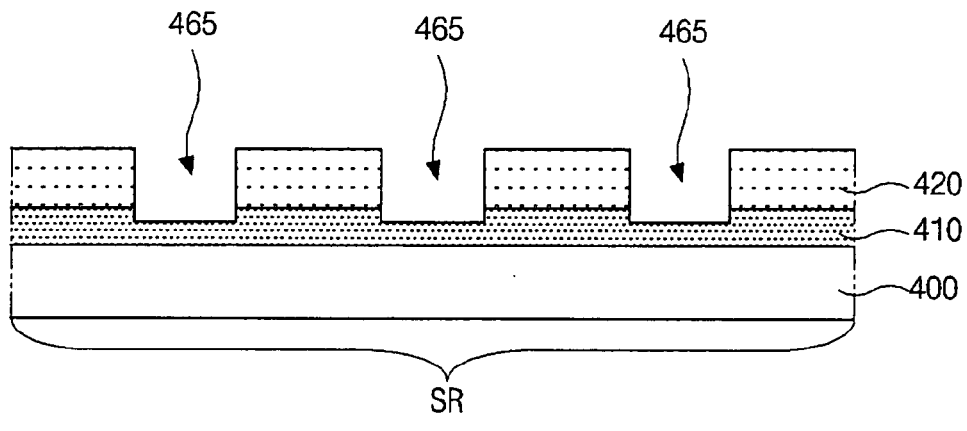

FIG. 12C shows that the first inorganic insulating layer 410 may be etched until the PR layer 440 (of FIG. 12B) is entirely removed, and multiple second grooves 465 form through the first inorganic insulating layer 410 and the organic insulating layer 420. Even though the first inorganic insulating layer 410 remains corresponding to the multiple second grooves 465 in this embodiment, the first inorganic insulating layer 410 corresponding to the multiple second grooves 465 may be entirely removed according to an etching condition that exposes the first substrate 400 in another embodiment.

Figure 12D:
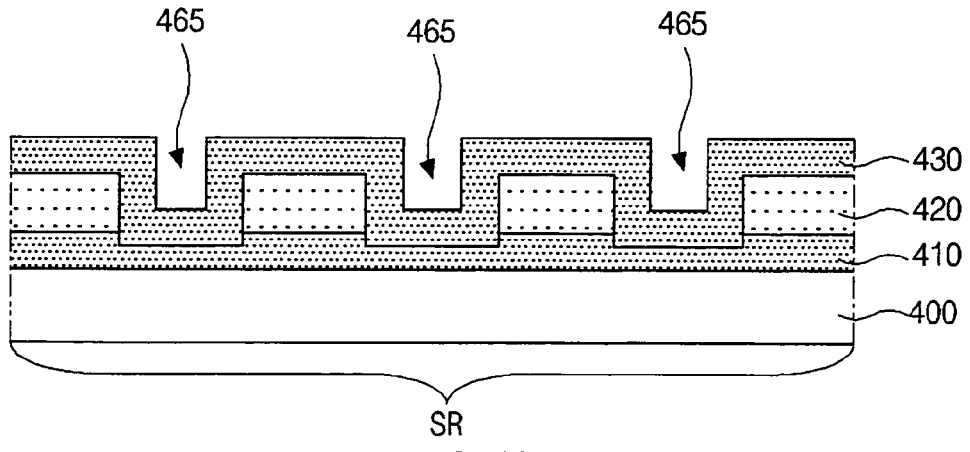

FIG. 12D shows a second inorganic insulating layer 430 being formed on the organic insulating layer 420. The second inorganic insulating layer 430 may be formed of an inorganic material such as silicon nitride (SiN$_x$), silicon oxide (SiO$_2$) or silicon oxynitride (SiO$_x$N$_y$). The second inorganic insulating layer 430 contacts the first inorganic insulating layer 410 (or the first substrate 400 in another embodiment) through the multiple second grooves 465.

Figure 12E:
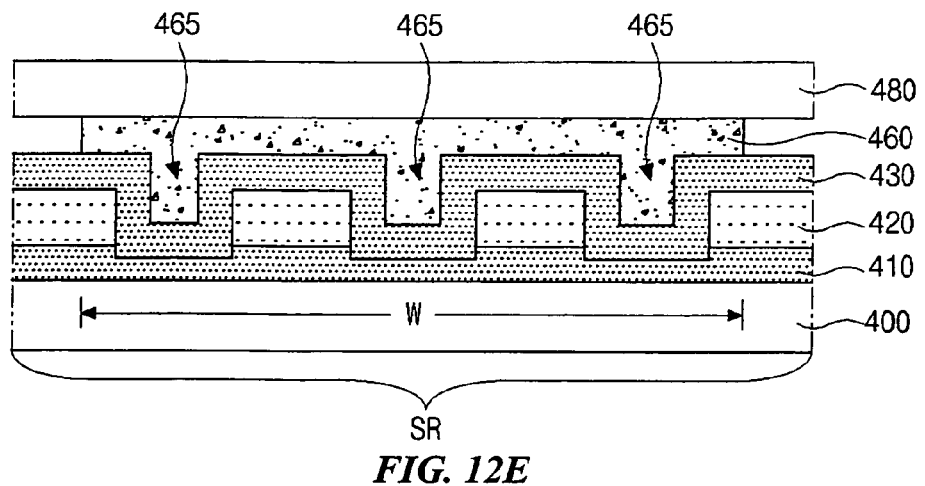

FIG. 12E shows a seal pattern 460 being formed on the second inorganic insulating layer 430 in the seal pattern region "SR." The second grooves 465 may be disposed to avoid multiple lines such as a gate line, a data line and a link line (not shown) from crossing the seal pattern region "SR." Moreover, the seal pattern 460 has a width "W" that covers the multiple second grooves 465. A second substrate 480 attaches to the first substrate 400 using the seal pattern 460.

In the fifth embodiment, since the seal pattern 460 contacts the second inorganic insulating layer 430, the adhesion of the seal pattern 460 is improved. Moreover, since the seal pattern 460 contacts the second inorganic insulating layer 430 at sidewalls of the multiple second grooves 465, the total contact area of the seal pattern 460 increases. Therefore, the adhesion of the seal pattern 460 further improves. In addition, since the seal pattern 460 does not contact the organic insulating layer 420, the seal pattern 460 does not chemically react with the organic insulating layer 420. Accordingly, contamination of a liquid crystal layer is prevented, and a stain near the seal pattern 460 is not observed in the LCD device.

Figure 13A:
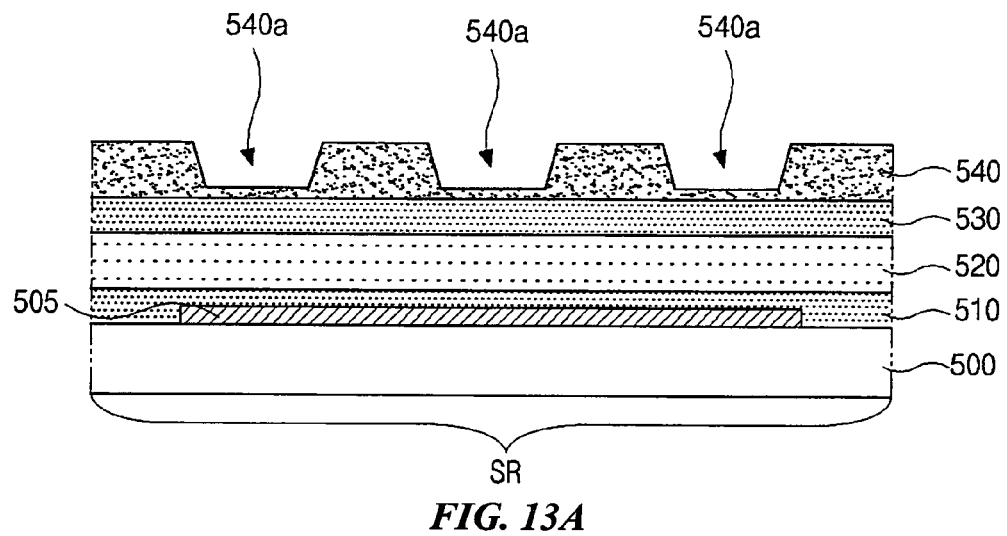
FIGS. 13A to 13C are schematic cross-sectional views, which correspond to a portion "F" of FIG. 3, showing a forming process of a seal pattern of a liquid crystal display device according to a sixth embodiment of the invention.
Figure 13B:
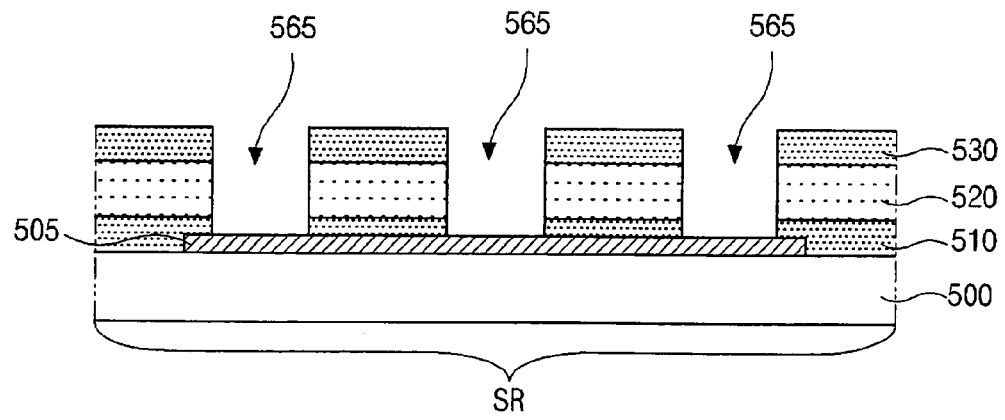
Figure 13C:
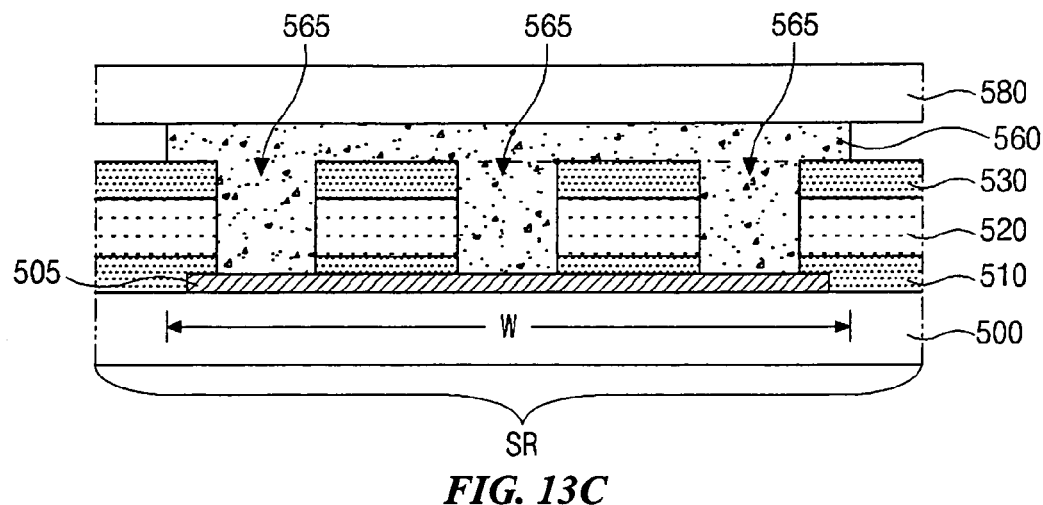

FIGS. 13A to 13C are schematic cross-sectional views, which correspond to a portion "F" of FIG. 3, showing a forming process of a seal pattern of a liquid crystal display device according to a sixth embodiment of the invention.

FIG. 13A shows a metal layer 505 having an island shape that is formed on a first substrate 500. With reference to FIG. 3, the metal layer 505 may be formed to be the same layer as a gate electrode of a thin film transistor (TFT) on the first substrate 500 without additional depositing and patterning steps. A first inorganic insulating layer 510, an organic insulating layer 520 and a second inorganic insulating layer 530 are sequentially formed on the metal layer 505. Even though not shown in FIG. 13A, the first inorganic insulating layer 510 may be formed to be the same layer as the gate insulating layer of the TFT, and the organic insulating layer 520 may be formed to be the same layer as the passivation layer covering the TFT. The first inorganic insulating layer 510 may be formed of an inorganic material such as silicon nitride (SiN$_x$), silicon oxide (SiO$_2$) or silicon oxynitride (SiO$_x$N$_y$), and the organic insulating layer 520 may be formed of an organic material such as benzocyclobutene (BCB), acrylic resin or methacrylic resin.

A PR layer 540 having multiple first grooves 540a is formed on the second inorganic insulating layer 530 through a photolithographic process. Even though not shown in FIG. 13A, after a mask having a slit or a half-transmissive portion is disposed over the PR layer 540, such that the slit or the half-transmissive portion corresponds to a seal pattern region "SR" (where the seal pattern is formed through a subsequent process), light is irradiated onto the PR layer 540 through the mask. Then the PR layer 540 is developed to form the multiple first grooves 540a. The PR layer 540 in the multiple first grooves 540a may be entirely removed to expose the second inorganic insulating layer 530 in another embodiment. A bottom surface of the PR layer 540 in the multiple first grooves 540a may have unevenness according to the width of the slit.

FIG. 13B shows that the PR layer 540 (of FIG. 13A), the second inorganic insulating layer 530, the organic insulating layer 520 and the first inorganic insulating layer 510 may be etched using a dry etching method until the PR layer 540 (of FIG. 13A) is entirely removed, and multiple second grooves 565 are formed through the first inorganic insulating layer 510, the organic insulating layer 520 and the second inorganic insulating layer 530. The metal layer 505 is exposed through the multiple second grooves 565. Even though the gate insulating layer is formed of an inorganic material in the sixth embodiment, the gate insulating layer is not restricted to inorganic materials and may be made of an organic material.

FIG. 13C shows a seal pattern 560 being formed on the second inorganic insulating layer 530 in the seal pattern region "SR." The seal pattern 560 contacts the metal layer 505 through the multiple second grooves 565. The multiple second grooves 565 may be disposed so as to avoid multiple lines such as a gate line, a data line and a link line (not shown) crossing the seal pattern region "SR." Moreover, the seal pattern 560 has a width "W" to cover the multiple second grooves 565. A second substrate 580 attaches to the first substrate 500 using the seal pattern 560.

In the sixth embodiment, the most seal pattern 560 contacts the metal layer 505 and the second inorganic insulating layer 530. The metal layer 505 may also be formed to be the same layer as a gate electrode of a TFT. Since adhesion of the seal pattern 560 and the metal layer 505 is better than that of the seal pattern 560 and the organic insulating layer 520, the adhesion of the seal pattern 560 improves without an additional photolithographic process. Moreover, since the seal pattern 560 contacts the first inorganic insulating layer 510, the organic insulating layer 520 and the second inorganic insulating layer 530 at sidewalls of the multiple second grooves 565, the total contact area of the seal pattern 560 increases. The adhesion of the seal pattern 560 is therefore further improved. In addition, since a chemical reaction of the seal pattern 560 and the organic insulating layer 520 is restrained, contamination of the liquid crystal layer is prevented. As a result, a stain near the seal pattern 560 is also prevented.

Figure 14A:
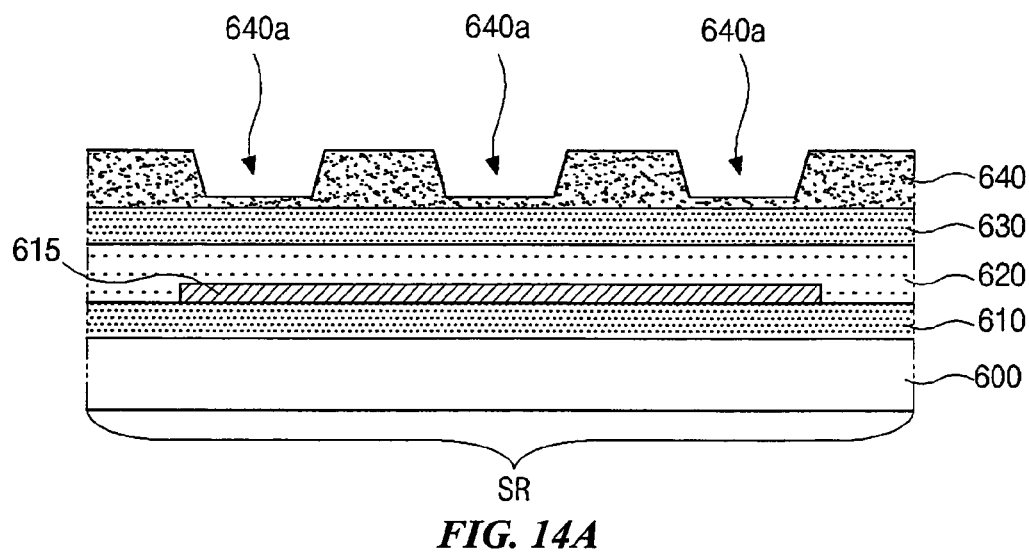
FIGS. 14A to 14C are schematic cross-sectional views, which correspond to a portion "F" of FIG. 3, showing a forming process of a seal pattern of a liquid crystal display device according to a seventh embodiment of the invention.
Figure 14B:
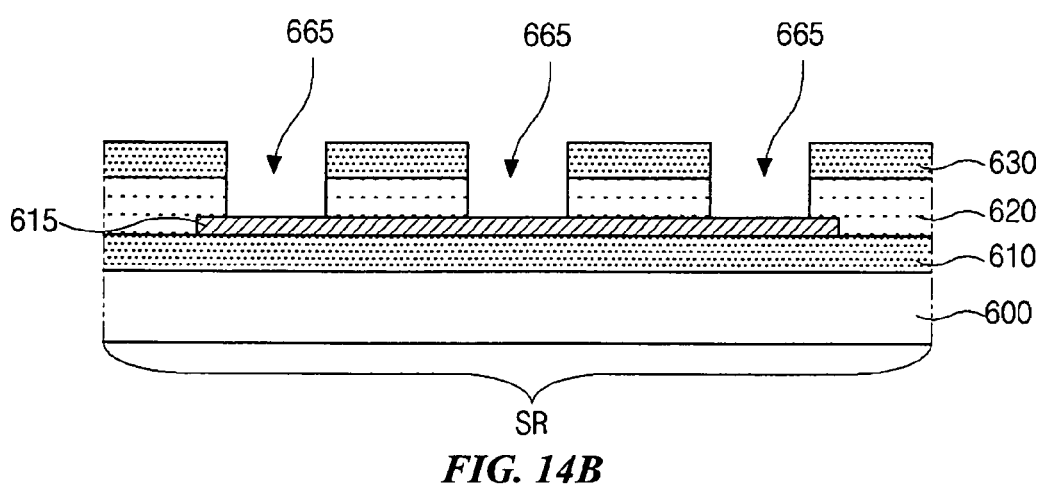
Figure 14C:
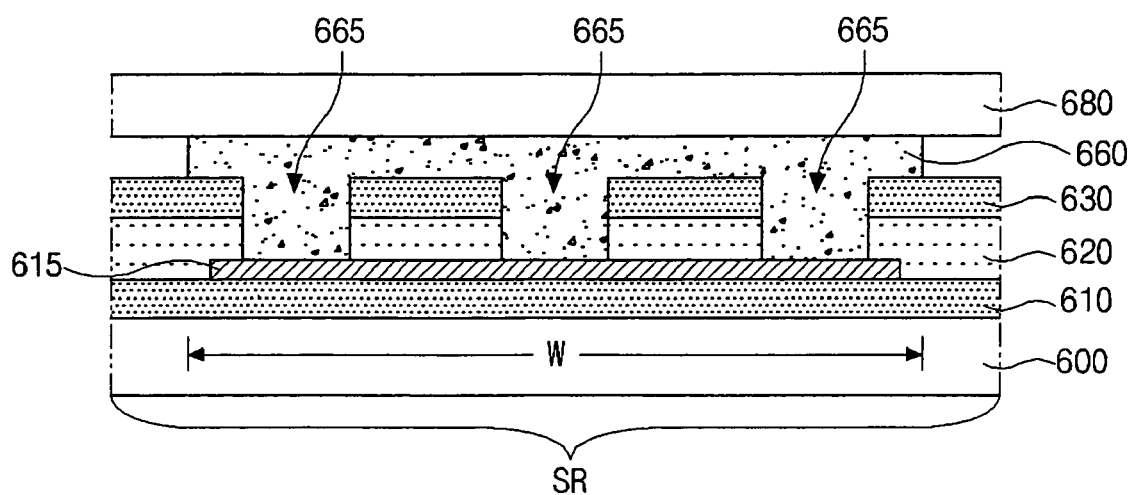

FIGS. 14A to 14C are schematic cross-sectional views, which correspond to a portion "F" of FIG. 3, showing a forming process of a seal pattern of a liquid crystal display device according to a seventh embodiment of the invention.

FIG. 14A shows a first inorganic insulating layer 610 being formed on a first substrate 600 and a metal layer 615 having an island shape being formed on the first inorganic insulating layer 610. With reference to FIG. 3, the metal layer 615 may be formed to be the same layer as source and drain electrodes of a thin film transistor (TFT) on the first substrate 600 without additional depositing and patterning steps. An organic insulating layer 620 and a second inorganic insulating layer 630 are sequentially formed on the metal layer 615. Even though not shown in FIG. 14A, the first inorganic insulating layer 610 may be formed to be the same layer as the gate insulating layer of the TFT, and the organic insulating layer 620 may be formed to be the same layer as the passivation layer covering the TFT. The first inorganic insulating layer 610 may be formed of an inorganic material such as silicon nitride ($SiN_x$), silicon oxide ($SiO_2$) or silicon oxynitride ($SiO_xN_y$), and the organic insulating layer 620 may be formed of an organic material such as benzocyclobutene (BCB), acrylic resin or methacrylic resin.

A PR layer 640 having multiple first grooves 640a is formed on the second inorganic insulating layer 630 through a photolithographic process. Even though not shown in FIG. 14A, after a mask having a slit or a half-transmissive portion is disposed over the PR layer 640 such that the slit or the half-transmissive portion corresponds to a seal pattern region "SR" (where the seal pattern is formed through a subsequent process), light is irradiated onto the PR layer 640 through the mask. Then the PR layer 640 is developed to form the plurality of first grooves 640a. The PR layer 640 in the multiple first grooves 640a may optionally be entirely removed to expose the second inorganic insulating layer 630. A bottom surface of the PR layer 640 in the plurality of first grooves 640a may have unevenness according to the width of the slit.

FIG. 14B shows that the PR layer 640 (of FIG. 14A), the second inorganic insulating layer 630 and the organic insulating layer 620 may be etched using a dry etching method until the PR layer 640 (of FIG. 14A) is entirely removed and multiple second grooves 665 are formed through the organic insulating layer 620 and the second inorganic insulating layer 630. The metal layer 615 is exposed through the multiple second grooves 665. Even though the gate insulating layer is formed of an inorganic material in the seventh embodiment, the gate insulating layer may also be made of an organic material.

FIG. 14C shows a seal pattern 660 that is formed on the second inorganic insulating layer 630 in the seal pattern region "SR." The seal pattern 660 contacts the metal layer 615 through the multiple second grooves 665. The multiple second grooves 665 may be disposed to avoid multiple lines such as a gate line, a data line and a link line (not shown) crossing the seal pattern region "SR." Moreover, the seal pattern 660 has a width "W" sufficient to cover the plurality of second grooves 665. A second substrate 680 attaches to the first substrate 600 using the seal pattern 660.

In the seventh embodiment, most of the seal pattern 660 contacts the metal layer 615 and the second inorganic insulating layer 630. The metal layer 615 may also be formed to be the same layer as source and drain electrodes of a TFT. Since adhesion of the seal pattern 660 and the metal layer 615 is better than that of the seal pattern 660 and the organic insulating layer 620, the adhesion of the seal pattern 660 improves without an additional photolithographic process. Moreover, since the seal pattern 660 contacts the organic insulating layer 620 and the second inorganic insulating layer 630 at sidewalls of the multiple second grooves 665, the total contact area of the seal pattern 660 increases. The adhesion of the seal pattern 660 is therefore further improved. In addition, since a chemical reaction of the seal pattern 660 and the organic insulating layer 620 is restrained or inhibited, contamination of the liquid crystal layer is prevented. As a result, a stain near the seal pattern 660 is also prevented.

Figure 15:
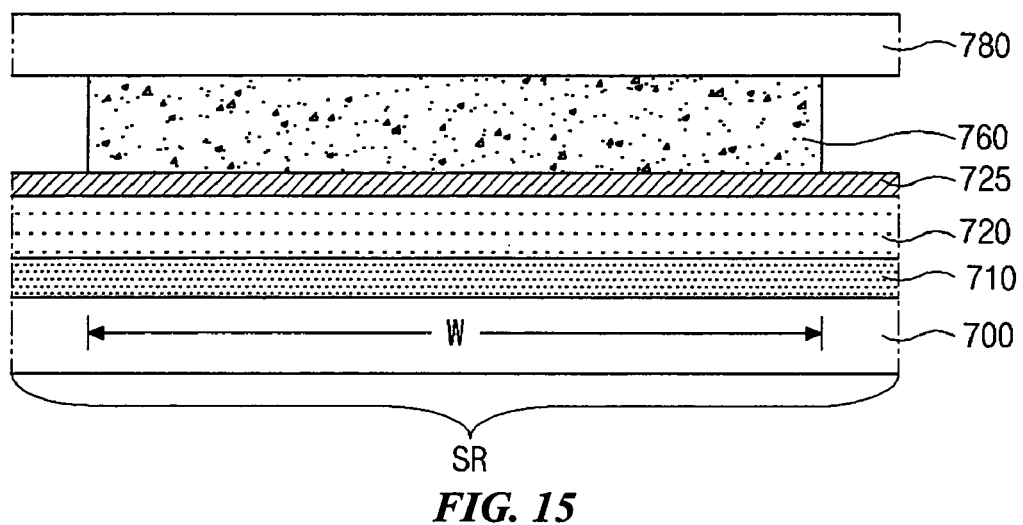
FIG. 15 is a schematic cross-sectional view showing a seal pattern of a liquid crystal display device according to an eighth embodiment of the invention.

FIG. 15 shows a schematic cross-sectional view depicting a seal pattern of a liquid crystal display device according to an eighth embodiment of the invention.

FIG. 15 shows an inorganic insulating layer 710 being formed on a first substrate 700 in a seal pattern region "SR," and an organic insulating layer 720 is formed on the inorganic insulating layer 710. A pixel layer 725 having an island shape is formed on the organic insulating layer 720. With reference to FIG. 3, the pixel layer 725 may be formed to be the same layer as a pixel electrode of a thin film transistor (TFT) on the first substrate 700 without additional depositing and patterning steps. In a transmissive type LCD device, the pixel layer 725 may be formed of a transparent conductive material such as indium-tin-oxide (ITO) or indium-zinc-oxide (IZO). In a reflective type LCD device, the pixel layer 725 may be formed of a metallic material such as aluminum alloy. The inorganic insulating layer 710 may be formed to be the same layer as a gate insulating layer of the TFT, and the organic insulating layer 720 may be formed to be the same layer as a passivation layer covering the TFT. A seal pattern 760 is formed on the pixel layer 725. A second substrate 780 attaches to the first substrate 700 using the seal pattern 760.

The seal pattern 760 does not contact the organic insulating layer 720 but contacts the pixel layer 725, and the adhesion between the seal pattern 760 and the pixel layer 725 is better than that between the seal pattern 760 and the organic insulating layer 720. Accordingly, the adhesion of the seal pattern 760 is improved. Moreover, since the seal pattern 760 does not chemically react to the organic insulating layer 720, the liquid crystal layer is not contaminated and a stain at a periphery of the seal pattern 760 due to contamination of the liquid crystal layer is prevented.

In the invention, the contact portion of the seal pattern and the organic insulating layer is reduced or eliminated, and the seal pattern contacts the other layer that has an excellent contact property. Accordingly, the adhesion of the seal pattern is improved such that defects such as a breakdown of the seal pattern are prevented. Moreover, defects such as a stain at the periphery of the seal pattern due to contamination of a liquid crystal layer is prevented.

While the invention has been particularly shown and described with reference to an illustrated embodiment thereof, it will be understood by those skilled in the art that the foregoing and other changes in form and details may be made therein without departing from the spirit and scope of the invention.

What is claimed is:
1. A liquid crystal display device, comprising:
first and second substrates facing and spaced apart from each other;
an inorganic insulating layer on an inner surface of the first substrate;
an organic insulating layer on the inorganic insulating layer;
a pixel layer on the organic insulating layer; and a seal pattern between the pixel layer and an inner surface of the second substrate, the seal pattern contacting the pixel layer, wherein a portion of the inorganic insulating layer below the pixel layer contacts the inner surface of the first substrate.

2. The device of claim 1, further comprising a thin film transistor on the first substrate and a pixel electrode connected to the thin film transistor, wherein the pixel layer is the same layer as the pixel electrode.

3. A fabricating method of a liquid crystal display device, comprising:

forming a thin film transistor and an inorganic layer on a first substrate;

forming a passivation layer covering the thin film transistor and the inorganic layer and including an organic material;

forming a pixel electrode and a pixel layer on the passivation layer, the pixel electrode being connected to the thin film transistor;

forming a seal pattern surrounding the thin film transistor; and attaching a second substrate to the first substrate such that the seal pattern contacts the pixel layer and the second substrate;

wherein a portion of the inorganic layer below the pixel layer contacts the first substrate.

* * * * *